US012587261B2

(12) United States Patent
Singh et al.

(10) Patent No.: US 12,587,261 B2
(45) Date of Patent: Mar. 24, 2026

(54) PREDICTIVE SIGNAL BOOSTING IN DISTRIBUTED TILE CONTROLLERS FOR RECONFIGURABLE METASURFACES

(71) Applicant: Dell Products L.P., Round Rock, TX (US)

(72) Inventors: Tejinder Singh, Manotick (CA); Navjot Kaur Khaira, Manotick (CA); Raja Neogi, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/656,441

(22) Filed: May 6, 2024

(65) Prior Publication Data

US 2025/0343592 A1     Nov. 6, 2025

(51) Int. Cl.
H04B 7/08          (2006.01)
H04B 7/04          (2017.01)

(52) U.S. Cl.
CPC ....... *H04B 7/0874* (2013.01); *H04B 7/04013* (2023.05)

(58) Field of Classification Search
CPC .......................... H04B 7/0874; H04B 7/04013
See application file for complete search history.

(56) References Cited

U.S. PATENT DOCUMENTS

| | | | |
|---|---|---|---|
| 10,770,790 B1 | 9/2020 | Mahanfar | |
| 11,329,375 B1 | 5/2022 | West et al. | |
| 11,855,745 B2 | 12/2023 | Schloemer | |
| 2016/0112117 A1 | 4/2016 | Platzer et al. | |
| 2019/0334228 A1 | 10/2019 | Haridas et al. | |
| 2022/0026524 A1 | 1/2022 | Maruyama et al. | |
| 2022/0231411 A1 | 7/2022 | Lin | |
| 2023/0142735 A1* | 5/2023 | Raghavan | H04B 7/15557 370/315 |
| 2024/0014862 A1 | 1/2024 | Duan et al. | |

(Continued)

OTHER PUBLICATIONS

Machine translation of CN-117768269-A (Year: 2024).*

(Continued)

*Primary Examiner* — Jean B Corrielus
(74) *Attorney, Agent, or Firm* — Amin, Turocy & Watson, LLP

(57)          ABSTRACT

The technology described herein is directed towards implementations of artificial intelligence (AI)-controlled unit cell subarrays for an active reconfigurable intelligent surface. The reconfigurable intelligent surface integrates an AI model-controlled switch and power amplifier in each subarray of unit cells to selectively amplify the reflected signal, resulting in variable power levels of the reflected signal. The AI model adapts to changing conditions including signal characteristics in real-time, adjusting amplification levels based on various factors for optimizing communication quality, while conserving power consumption by only amplifying to a determined amplification level. Power is also saved by sharing the switch and power amplifier in each subarray of unit cells. Via the per subarray switch, the design provides a device for receiving and reflecting the electromagnetic signal as a signal amplified (or not) to an AI-determined level by coupling the RF energy, processing, and selectively amplifying or not amplifying the reflected signal per subarray.

20 Claims, 15 Drawing Sheets

(56) References Cited

U.S. PATENT DOCUMENTS

| | | |
|---|---|---|
| 2024/0364019 A1 | 10/2024 | Hussain |
| 2025/0062529 A1 | 2/2025 | Nathan et al. |
| 2025/0125525 A1 | 4/2025 | Rossanese et al. |
| 2025/0274165 A1 | 8/2025 | Manolakos et al. |

OTHER PUBLICATIONS qorvo.com, "CMD262 26-28 GHZ (Ka Band) GaN Power Amplifier", Rev-A, URL—https://www.qorvo.com/products/p/CMD262, Jun. 14, 2022, 1 page.

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.

Long et al., "Active Reconfigurable Intelligent Surface Aided Wireless Communications", IEEE Transactions on Wireless Communications, vol. 20, No. 8, Aug. 2021, pp. 4962-4975.

Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.

Gros et al., "A Reconfigurable Intelligent Surface at mmWave Based on a Binary Phase Tunable Metasurface", IEEE Open Journal of the Communications Society, vol. 2, 2021, pp. 1055-1064.

Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.

Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.

Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.

Ojaroudi et al., "Graphene-Based Reconfigurable Intelligent Metasurface Structure for THz Communications", 15th European Conference on Antennas and Propagation, 2021, 5 pages.

Tasci et al., "A New RIS Architecture With a Single Power Amplifier: Energy Efficiency and Error Performance Analysis", IEEE Access, Apr. 2022, 11 pages.

Bai et al., "RIS-Assisted Green Secure Communications: Active RIS or Passive RIS?", IEEE Wireless Communications Letters, Dec. 6, 2022, 5 pages.

Goldman et al., "SpaceX and T-mobile Focus on Direct Satellite-to-Smartphone to Improve Mobile Coverage in Remote Areas", Analysys Mason, Aug. 2022, 5 pages.

Jewett, Rachel, "How Big is the Satellite Industry's Direct-to-Device Opportunity?", Via Satellite, Sep. 12, 2023, Url—https://www.satellitetoday.com/connectivity/2023/09/12/how-big-is-the-satellite-industrys-direct-to-device-opportunity/, Retrieved from the internet Dec. 2, 2024, 4 pages.

"Electromagnetic Metasurface", Wikipedia, URL—https://en.wikipedia.org/wiki/Electromagnetic_metasurface#, Retrieved from the internet Dec. 2, 2024, 9 pages.

Schweber, Bill., "The Doppler Effect: From Highly Ridiculed to Absolutely Indispensable, Part 1", Electrical Engineering News and Products, Apr. 19, 2022, URL—https://www.eeworldonline.com/the-doppler-effect-from-highly-ridiculed-to-absolutely-indispensable-part-1/, Retrieved from the internet Dec. 2, 2024, 14 pages.

"Doppler Effect", Wikipedia, URL-https://en.wikipedia.org/wiki/Doppler_effect, Retrieved from the internet Dec. 2, 2024, 8 pages.

Long et al., "A Promising Technology for 6G Wireless Networks: Intelligent Reflecting Surface", Journal of Communications and Information Networks, vol. 6, No. 1, Mar. 2021, 16 pages.

Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.

Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.

Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.

3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.

3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.

3GPP TS 38.108 V17.0.0, 3rd Generation Partnership Project; Technical Specification Group Radio Access Network; NR; Satellite Access Node radio transmission and reception,(Release 17), Jun. 2022, 58 pages.

"DVB", Wikipedia, URL—https://en.wikipedia.org/wiki/DVB, Retrieved from the internet Dec. 2, 2024, 12 pages.

"DVB-S", Wikipedia, URL—https://en.wikipedia.org/wiki/DVB-S, Retrieved from the internet Dec. 2, 2024, 2 pages.

"DVB-S2", Wikipedia, URL—https://en.wikipedia.org/wiki/DVB-S2, Retrieved from the internet Dec. 2, 2024, 7 pages.

"DVB-S2X", Wikipedia, URL—https://en.wikipedia.org/wiki/DVB-S2X, Retrieved from the internet Dec. 2, 2024, 2 pages.

The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.

DVB Org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.

DVB Org., "Second Generation Framing Structure, Channel Coding and Modulation Systems for Broadcasting, Interactive Services, News Gathering and Other Broadband Satellite Applications; Part 2: DVB-S2 Extensions (DVB-S2X)", DVB Document A083-2 Rev.4, Feb. 2024, 166 pages.

"Facts and Figures 2022—Mobile Network Coverage 2022", ITU, URL—https://www.itu.int/itu-d/reports/statistics/2022/11/24/ff22-mobile-network-coverage/, Retrieved from the internet Dec. 2, 2024, 4 pages.

Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.

ETSI EN 300 421 V1.1.2, "Digital Video Broadcasting (DVB); Framing Structure, Channel Coding and Modulation for 11/12 Ghz Satellite Services", Aug. 1997, 24 pages.

ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.

ETSI EN 302 307 V1.2.1, Digital Video Broadcasting (DVB); Second Generation Framing Structure, Channel Coding And Modulation Systems for Broadcasting, Interactive Services, News Gathering and Other Broadband Satellite Applications (DVB-S2), Aug. 2009, 78 pages.

ETSI TR 102 376-1 V1.2.1, "Digital Video Broadcasting (DVB); Implementation Guidelines for the Second Generation System For Broadcasting, Interactive Services, News Gathering and other Broadband Satellite Applications; Part 1: DVB-S2", Nov. 2015, 118 pages.

ETSI TR 102 376-2 V1.2.1, "Digital Video Broadcasting (DVB); Implementation Guidelines for the Second Generation System for

(56) References Cited

OTHER PUBLICATIONS

Broadcasting, Interactive Services, News Gathering and other Broadband Satellite Applications; Part 2: S2 Extensions (DVB-S2X)", Jan. 2021, 212 pages.

Lee et al., "Integrated DVB-X2 Receiver Architecture with Common Acceleration Engine", Applied Sciences, vol. 9, No. 3983, Sep. 23, 2019, 16 pages.

Nemer, Elias., "Physical Layer Impairments in DVB-S2 Receivers", Second IEEE Consumer Communications and Networking Conference, 2005, pp. 487-492.

DVB Org., "White Paper on the use of DVB-S2X for DTH applications, DSNG & Professional Services, Broadband Interactive Services and VL-SNR applications", DVB Document A172, Mar. 2015, 16 pages.

Babcock, Stephen., "AT&T Invested $450M in Maryland Network Upgrades Over 3 Years", Technical.ly, URL—https://technical.ly/startups/att-invested-450m-in-maryland-network-upgrades-over-3-years/, Jul. 9, 2019, Retrieved from the internet Dec. 2, 2024, 7 pages.

Tyree et al., "AT&T Providing Cell on Wheels to Help with Internet Connection at LU's Graduation", URL—https://wset.com/news/local/att-providing-cell-on-wheels-to-help-with-internet-connection-at-lus-graduation, May 10, 2017, Retrieved from the internet Dec. 2, 2024, 6 pages.

ITU, "H.222.0 : Information Technology—Generic Coding of Moving Pictures and Associated Audio Information: Systems", International Telecom Union, Aug. 2018, 306 pages.

Cioni et al., "DVB-S2X Physical Layer Performance Results Over Realistic Channel Models", International Journal of Satellite Communications and Networking, vol. 34, No. 3, Jul. 2015, 21 pages.

"MPEG Transport Stream", Wikipedia, URL-https://en.wikipedia.org/wiki/MPEG_transport_stream, Retrieved from the internet Dec. 2, 2024, 10 pages.

Keese, Col. John E., "Satellite Telemetry, Tracking and Control Subsystems", Massachusetts Institute of Technology, Oct. 29, 2003, 35 pages.

NASA, "State-of-the-Art of Small Spacecraft Technology", NASA 9.0 Communications, Feb. 12, 2024, 32 pages.

Stuhlfauth, Reiner. "5G NTN Takes Flight: Technical Overview of 5G Non-Terrestrial Networks", Rohde & Schwarz, White Paper, Version 01.00, 2022, 124 pages.

Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.

"Aerial SDK Layer 1" Nvidia Docs Hub, https://docs.nvidia.com/aerial/archive/aerial-sdk/23-1/text/product_brief/aerial_sdk_layer_1.html] retrieved Jan. 16, 2025, 30 pages.

Healy, et al. "Layer-1 Physical Interface Transcoder Leveraging Metasurfaces" U.S. Appl. No. 18/899,886, filed Sep. 27, 2024, 63 pages.

Healy, et al. "Connecting Wi-Fi-Enabled Device to Non-Terrestrial Satellite Constellations" U.S. Appl. No. 18/899,909, filed Sep. 27, 2024, 55 pages.

Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.

Healy, et al. "Universal Layer-1 Physical Interface Transcoder for Terrestrial and Non-Terrestrial Air-Interfaces" U.S. Appl. No. 18/899,739, filed Sep. 27, 2024, 62 pages.

Singh, et al. "Metasurface Integrated Non-Terrestrial Network Transcoder With Adaptive Slicing for Dynamic Allocation of Mesh Resources" U.S. Appl. No. 18/902,100, filed Sep. 30, 2024, 64 pages.

Singh, et al. "Edge Computing and Metasurfaces in Non-Terrestrial Network-Connected Transcoder Nodes" U.S. Appl. No. 18/902,158, filed Sep. 30, 2024, 66 pages.

Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.

Singh, et al. "Allocating Primary and Secondary Metasurface Integrated Non-Terrestrial Network Transcoder Nodes" U.S. Appl. No. 18/902,360, filed Sep. 30, 2024, 64 pages.

Healy, et al. "Model-Controlled Layer-1 Physical Interface Transcoder To Support Hybrid Terrestrial and Non-Terrestrial Ground and Space Mesh Network" U.S. Appl. No. 18/899,504, filed Sep. 27, 2024, 64 pages.

Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.

Singh, et al. "Secure Non-Terrestrial Network Links Utilizing Quantum Key Distribution Integrated Into a Metasurface Transcoder Node With Hardware Polarization Control" U.S. Appl. No. 18/902,422, filed Sep. 30, 2024, 37 pages.

Singh, et al. "Signal Correction Based On Environmental Factors in Metasurfaces for Non-Terrestrial Network Transcoder Nodes" U.S. Appl. No. 18/902,454, filed Sep. 30, 2024, 53 pages.

Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

Khaira, et al. "Energy-Efficient Active Reconfigurable Intelligent Surface With Selective Amplification" U.S. Appl. No. 18/609,134, filed Mar. 19, 2024, 39 pages.

Singh, et al. "Reconfigurable Intelligent Surface Integrated on Compact Drones for Wireless Network Survey" U.S. Appl. No. 18/913,434, filed Oct. 11, 2024, 36 pages.

Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.

Singh, et al. "Reconfigurable Intelligent Surfaces That Self Heal and Adapt by Altering the Tile Geometry" U.S. Appl. No. 18/656,431, filed May 6, 2024, 74 pages.

Ye, et al. "Enhancing Non-Terrestrial Network Direct-to-Everything Service With Metasurfaces" U.S. Appl. No. 18/739,880, filed Jun. 11, 2024, 39 pages.

Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.

Healy, et al. "Transcoding the Air-Interface Between Non-Terrestrial and Terrestrial Networks Leveraging Integrated Transcoder and Metasurface Mounted On a Drone" U.S. Appl. No. 18/780,254, filed Jul. 22, 2024, 61 pages.

Healy, et al. "Communication Between Non-Terrestrial and Terrestrial Networks Based on Layer-1 Physical Packet-Level Transcoding" U.S. Appl. No. 18/780,269, filed Jul. 22, 2024, 59 pages.

Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.

Notice of Allowance received for U.S. Appl. No. 18/609,134 dated Sep. 16, 2025, 11 pages.

Notice of Allowance received for U.S. Appl. No. 18/739,880 dated Nov. 12, 2025, 10 pages.

Notice of Allowance received for U.S. Appl. No. 18/797,975 dated Sep. 19, 2025, 9 pages.

* cited by examiner

PREDICTIVE SIGNAL BOOSTING IN DISTRIBUTED TILE CONTROLLERS FOR RECONFIGURABLE METASURFACES

BACKGROUND

Reconfigurable intelligent surfaces (alternatively referred to as intelligent reflective surfaces, or metasurfaces) are manmade thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal. Because of their ability to alter the attributes of signals reflected at the surface, intelligent reflective surfaces are being evaluated for use in beyond fifth generation (B5G) and sixth generation (6G) wireless communication and wireless sensing networks.

In communications assisted by a reconfigurable intelligent surface, signal strength at the receiver is significantly constrained by the distance the signal needs to travel. Increasing the size of the reconfigurable intelligent surface is a common method to counteract free-space signal loss, but this can be costly and energy-intensive.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
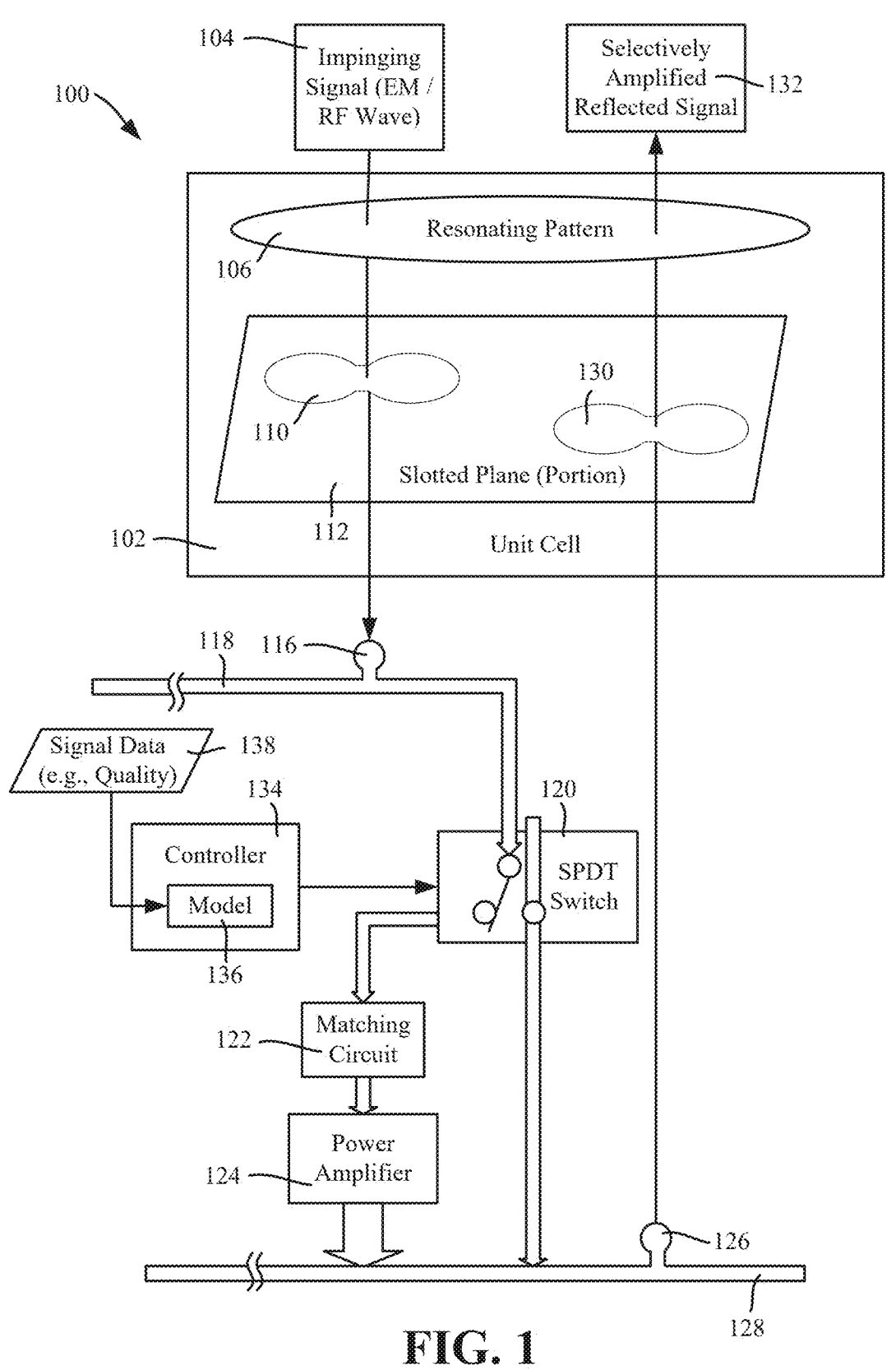
FIG. 1 is an example conceptual block diagram showing a unit cell of a unit cell subarray of a reconfigurable intelligent surface for reflecting an incoming signal with selective amplification of the subarray, in accordance with various example embodiments and implementations of the subject disclosure.

The technology described herein is generally directed towards a reconfigurable intelligent surface design and implementation that facilitates selective amplification of signals reflected by the reconfigurable intelligent surface. An integrated switch, controlled by a controller based on a trained artificial intelligence/machine learning (AI/ML) model, provides for selective control over signal amplification, to allow for signal enhancement by amplification only when deemed appropriate. For example, the signal quality data (e.g., signal strength and signal-to-noise ratio data) can be used to determine whether how much amplification is likely to be beneficial to achieve desired signal quality performance metrics. The technology thus efficiently manages power consumption while improving the overall functionality of a reconfigurable intelligent surface.

In one implementation, the AI-controlled amplification as described herein can dynamically adjust reconfigurable intelligent surface amplification based on real-time data, leading to more efficient and responsive signal management. Further, the amplification can be based on predictive analytics for signal management, in which the AI model utilizes historical data (e.g., via learning) and current data to anticipate network needs, enabling preemptive signal amplification for improved performance. Intelligent management of signal strength as described herein facilitates reduced overall network congestion and the associated maintenance, while realizing energy efficiency and cost efficiency (reduced operational costs) through the on-demand activation of amplifiers for signal boosting, rather than having continuous high-power operation.

Such AI-controlled amplification can be localized with a controller (e.g., a tile controller such as an FPGA) coupled to the reconfigurable intelligent surface (tile), thereby distributing decision-making intelligence to a local tile controller of a reconfigurable intelligent surface for autonomous, on-demand signal amplification. This facilitates personalized network experiences by addressing signal quality locally within the tile controllers, while reducing correction latency compared to global feedback, which results in a significantly improved user experience, particularly in real-time applications. Notwithstanding, the technology described herein is not limited to local controllers, but can alternatively (or in addition to a local controller) can have at least some centralized control, e.g., at an edge cloud controller that manages multiple local controllers.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a unit cell 102 that redirects (reflects or refracts) an impinging (incoming) signal 104, (an electromagnetic (EM)/radio frequency (RF) wave, such as near or within the millimeter wavelength, e.g., above 25 gigahertz). A metallic resonating pattern 106 resonates at a frequency that corresponds to the frequency of the incoming signal. As set forth herein, a unit cell 102 can have a resonating pattern 106 of any suitable shape (e.g., square, rectangular, concentric ring-shape, coupled circles and so on) that resonates at a corresponding frequency of the incoming signal, and is thus not limited to any particular pattern.

A first opening 110 (e.g., an hourglass-shaped opening) in a slotted plane 112 beneath and electrically insulated from the metallic resonating pattern 106 passes (e.g., RF couples/transfers) the signal 106 to a contact/terminal 116 of a first microstrip line 118 that is beneath and electrically insulated from the slotted plane 112. The slotted plane, which blocks the incoming RF signal (except via the opening 110) can be divided into electrically separated portions, e.g., one per unit cell, to help mitigate potential interference with respect to other unit cells. As set forth herein, a unit cell 102 can have an opening 110 of any suitable shape and size that passes the corresponding frequency of the incoming signal 104, and is thus not limited to hourglass-shaped openings. Example alternatives include, but are not limited to, rectangular slots, circular coupled slots, or ring-shaped slots; indeed, the slots can have any arbitrary slot shape that can couple a maximum amount of signal to and from the microwave circuit/signal pickup terminals (of microstrip lines as described herein) underneath.

The first microstrip line 118 is coupled to a switch 120 (e.g., a single-pole, double-throw, or SPDT switch), which is controlled as described herein to be in a first operational state or a second operational state. The first operational state of the switch 120 selectively couples the first microstrip line 118 via an impedance matching circuit 122 to a power amplifier 124, such that the incoming signal passed to the terminal 118 is amplified. The output of the power amplifier 124 is electrically coupled to a contact/terminal 126 via an electrical coupling of the power amplifier 124 to a second microstrip line 128. Via the contact/terminal 126, the amplified signal is passed through a second opening 130 (e.g., an hourglass-shaped opening) in the slotted plane 112, by which the amplified and delayed signal reaches the resonating pattern 106, resulting in an amplified and delayed redirected (e.g., reflected) signal 132 when the switch 120 (as represented in FIG. 1) is in the first operational state.

The second operational state of the switch 120, not explicitly represented in FIG. 1, selectively couples the first microstrip line 118 to the second microstrip line 128, bypassing amplification. Via the contact/terminal 126, the non-amplified signal is passed through a second opening 130 (e.g., an hourglass-shaped opening) in the slotted plane 112, by which the non-amplified signal reaches the resonating pattern 106, resulting in a redirected (e.g., reflected) non-amplified signal. Among other benefits, selectively bypassing amplification conserves energy.

As will be understood, the switch 120, matching circuit 122 and power amplifier 124 are shared, via the first microstrip line 118 and the second microstrip line 128, with one or more other unit cells. This reduces the high energy cost associated with each power amplifier. For example, a 3×3 subarray (subgroup) of unit cells based on the shared power amplifier design described herein results in only one amplifier for each subarray of nine unit cells, or one-ninth of the energy consumed by having a power amplifier per unit cell. As can be readily appreciated, instead of the 3×3 subarray used in the examples herein, other subarrays can be used, e.g., 2×2, 4×4, 5×5 and so on, depending on the tradeoff between power usage and the strength of the amplified reflected signal. Moreover, a non-symmetrical subgroup/subarray can be used, e.g., 3×4, 3×5 and so on; however symmetrical subgroups having the same number of unit cells in each dimension (m=n) allow for modular design, as does having a reconfigurable intelligent surface made of same-sized subarrays, which also keeps design computations straightforward. The gain can be increased by less elements per amplifier, while the reflected beam is narrowed by more elements per amplifier; the cost versus elements per module/amplifier is a tradeoff that can be matched to a particular scenario where a reconfigurable intelligent surface is desired.

Turning to selective amplification in general, as described herein a controller 134 runs a trained model 136 to obtain a decision as to whether to operate the switch 120 in the first operational state to have the power amplifier 124 amplify the incoming signal 104, or the second operational state to bypass the amplifier 124. The decision is based on inputting signal data 138 that is relevant to the reconfigurable intelligent surface (of which the unit cell 102 is a redirection (reflection or refraction) element), into the trained model 136. The signal data 138, e.g., signal quality data such as received signal strength (RSSI), signal-to-noise ratio (SNR) data and/or other metrics, can correspond to a received signal that was redirected from the unit cell's reconfigurable intelligent surface to a user equipment or the like and reported back by the receiver, e.g., to the base station that originated the signal. The base station is coupled to the controller 134, which can be a local tile controller for the reconfigurable intelligent surface or a centralized controller coupled to multiple tile controllers, and thus the controller 134 receives the signal data 138.

To summarize thus far, a significant enhancement to reconfigurable intelligent surface technology is described herein by the integration of and selective use of power amplifiers. During the fabrication process, the switches and power amplifiers can be surface mounted onto a reconfigurable intelligent surface. To avoid the high cost and power demands of outfitting each reconfigurable intelligent surface element (unit cell) with a switch and power amplifier, described herein is integrating a switch and power amplifier with every m×n cluster (subgroup) of elements. In one implementation, in order to get a wide bandwidth response, two hourglass-shaped slots are used to couple the RF energy from the incoming signal and then transmit the reflected signal. When coupled to the power amplifiers, proper impedance matching between the reconfigurable intelligent surface elements is maintained by using the matching circuits to minimize signal reflection.

In the reconfigurable intelligent surface based on the technology described herein, signal amplification is thus achieved, when selected, by integrating power amplifiers into the reconfigurable intelligent surface, powered by an external DC voltage source. The power needed for the amplification functionality depends on the factors such as the type of power amplifier (PA) used, and the number of reconfigurable intelligent surface subarrays used in the complete reconfigurable intelligent surface panel. Different surface mounted device power amplifiers are commercially available, some of which are extremely power efficient depending on the technology used. For example, using a typical gallium nitride-based power amplifier at the targeted operating frequency range (26 to 28 GHz) in a 9×9 unit cell subarray needs V=20 V and I=350 mA, or a power P=7 W.

It should be noted that signal amplification is decided on a per-unit cell subarray basis. Thus, for example, for a reconfigurable intelligent surface having twenty-five subarrays, e.g., 5×5 subarrays each of 9×9 unit cells, the model 136 may decide, for one current set of conditions that are represented (at least in part) by current signal data 138, to turn on amplification for twelve of the twenty-five subarrays, and bypass amplification for the other thirteen. Then, at a later time having a different set of conditions, the model 136 may decide to turn on amplification for four of the twenty-five subarrays, and bypass amplification for the other twenty-one.

As is understood, such selective amplification on an on-demand, real-time basis conserves energy by only amplifying the number of subarrays that are appropriate for good signal quality, which may any number ranging from zero subarrays (zero total amplification) to all subarrays (maximum total amplification) of the reconfigurable intelligent surface, or any combined amplification level in between. This is in contrast to traditional systems that are passive (no amplification), or that may use static or manually adjusted signal amplification, generally on an all-or-nothing basis. The resulting redirected electromagnetic wave is thus a combination (e.g., through constructive interference) of the individual subarray's amplified or non-amplified output.

Figure 2A:
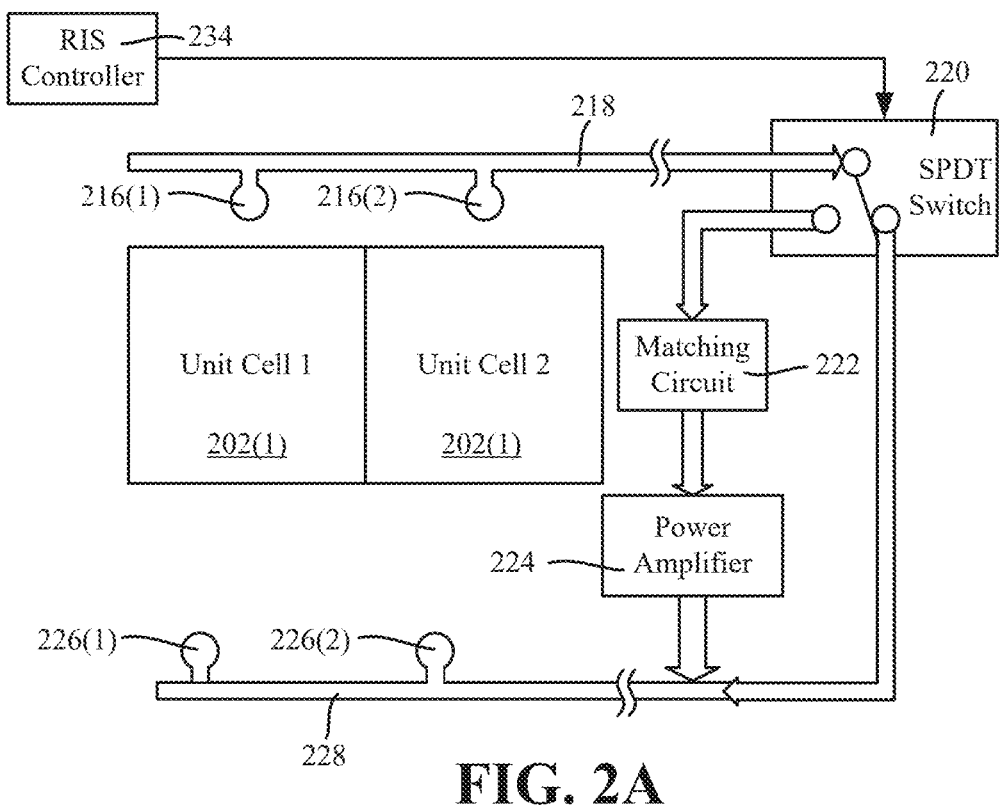
FIG. 2A is an example conceptual block diagram showing unit cells of a subarray of a reconfigurable intelligent surface that share circuitry for reflecting an incoming signal with selective amplification, in accordance with various example embodiments and implementations of the subject disclosure.

FIG. 2A shows the concept of unit cells 202(1) and 202(2) sharing a switch 220, matching circuit 222, and power amplifier 224. The switch 220 is selectively toggled by a controller 234 for the reconfigurable intelligent surface (RIS). The first (incoming signal) microstrip line 218 has a contact/terminal 216(1) and 216(2) for the unit cells 202(1) and 202(2), respectively, to couple the incoming signal to the switch 220. As can be seen, the contacts 216(1) and 216(2) of microstrip line 218 for the unit cells 202(1) and 202(2), respectively, act as a combining circuit that captures the incoming signal energy, directed through interlayer vias (described herein) to the surface mounted switch 120.

In the second operational state of the switch 220 as represented in FIG. 2, the switch 120 electrically couples the first microstrip line 218 to the second microstrip line 228. In the first operational state of the switch 220, (not explicitly represented in FIG. 2), the switch 120 electrically couples the first microstrip line 218 to the shared matching circuit 222 and power amplifier 224. Thus, in the first switch state, the amplified output signal of the shared matching circuit 222 and power amplifier 224 is electrically coupled to the second microstrip line 228, which has a contact/terminal 226(1) and 226(2) for the unit cells 202(1) and 202(2), respectively, to couple the amplified signal to their respective metallic resonating patterns as generally described with reference to FIG. 1.

In general, providing selective amplification capabilities within a reconfigurable intelligent surface subarray presents a solution to increasing signal strength, such as to increase the distance a signal needs to travel or deal with adverse network conditions, without necessarily increasing the size of the reconfigurable intelligent surface. This is in contrast to present reconfigurable intelligent surface-based systems that are "passive" in that they do not possess the ability to amplify signals during wave-matter interactions. To enhance the effectiveness of reconfigurable intelligent surface in signal transmission, power amplifiers within the reconfigurable intelligent surface subgroups (subarrays) boost the strength of the reflected signals. The integration of switches as described herein facilitates selective amplification, allowing a reconfigurable intelligent surface (e.g., a controller coupled thereto) to intelligently determine when and how much amplification is needed, thereby conserving energy when not fully needed. Further, example designs described herein also significantly reduce the number of amplifiers, such as employing just one power amplifier for every m×n reconfigurable intelligent surface elements, which leads to lower costs, reduced power consumption, reduced heat dissipation, lesser signal distortion, and more manageable interference.

Figure 2B:
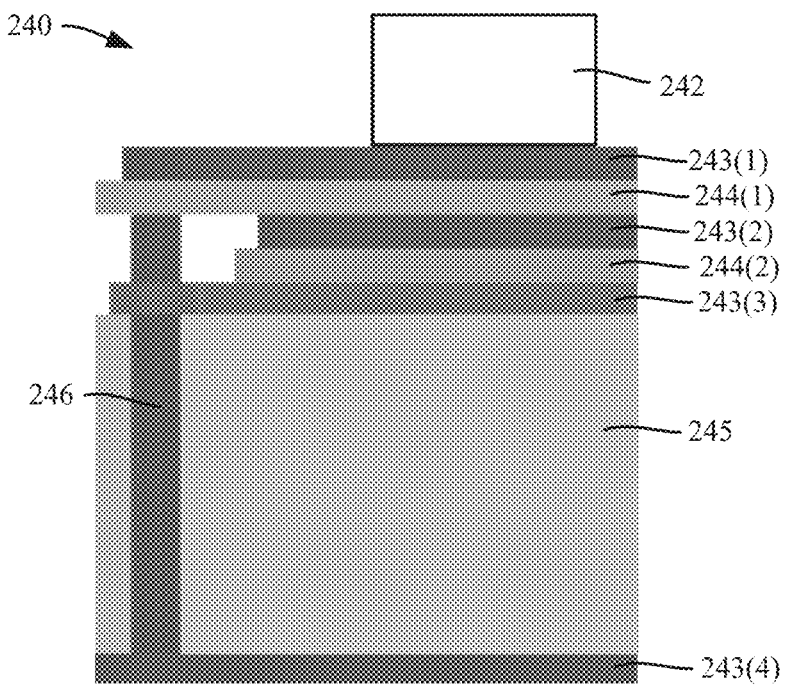
FIG. 2B is a cross-sectional side-view of an example subarray for unit cells, in accordance with various example embodiments and implementations of the subject disclosure.

FIG. 2B shows a side view of an example implementation of a subarray 240 showing how the subarray 240 can be configured as a stack of layers. The depicted layers include the surface-mounted components 242, a topmost (first) metal layer 243(1) that corresponds to the layer of the resonating elements, a first dielectric layer 244(1), a second metal layer 243(2) (that corresponds to the slotted plane 112 of FIG. 1), a second dielectric layer 244(2), and a third metal layer 243(3) (that corresponds to the first microstrip line 118 and the second microstrip line 128 of FIG. 1). The dielectric layers are generally transparent to the frequency of the incoming and outgoing signals. These layers are atop a dielectric substrate 245, with a fourth metal layer 243(4) that is the metal ground layer. Also shown on the left side of the subarray 240 is one of the vias 246.

Figure 3:
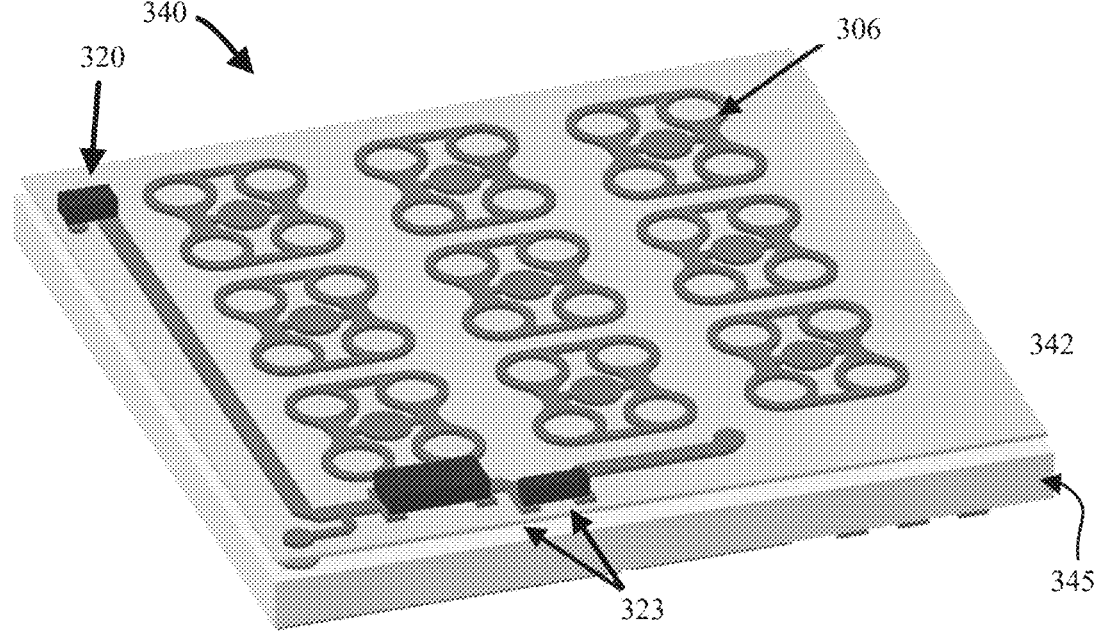
FIG. 3 is a top view perspective representation of an example design of a subarray that includes unit cells with resonating metallic patterns, and surface mounted components above a dielectric substrate, in accordance with various example embodiments and implementations of the subject disclosure.

FIG. 3 shows a three-dimensional perspective view of an example implementation of a 3×3 subarray 340 in which top-layer components are visible above a dielectric substrate 345. In FIG. 3, one of the resonating metallic patterns is labeled as 306. The switch 320 in this example implementation is a surface mounted component, as are the amplifier and matching circuit (collectively labeled 323).

Figure 4:
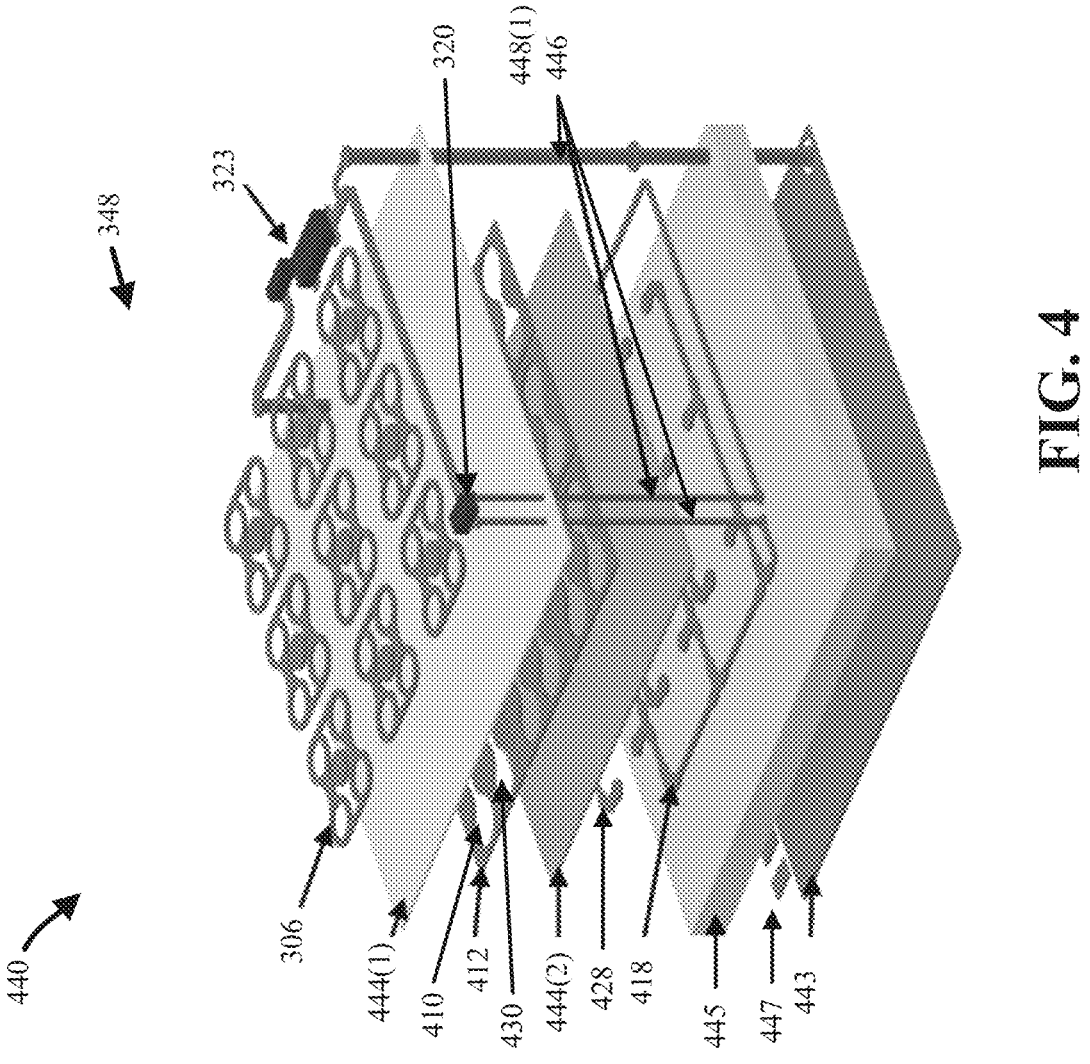
FIG. 4 is an exploded view representation of the example design of FIG. 3 showing a stack of layers of the subarray, in accordance with various example embodiments and implementations of the subject disclosure.

FIG. 4 shows an exploded view perspective representation 440 of the example fabricated 3×3 subarray 330 of unit cells of FIG. 3, including the resonating patterns of each unit cell. As in FIG. 3, the resonating pattern 306 of one unit cell is labeled, with labels for the other resonating patterns of the other unit cells omitted for clarity. Also shown at the upper layer are the surface mounted switch 320, and the surface mounted amplifier and matching circuit (collectively labeled 323).

The next layer down is a first dielectric layer 444(1), with the metallic slotted plane layer 412 beneath the first dielectric layer 444(1). Note that a single shared dielectric 444(1) is shown at this upper dielectric layer, however such an upper dielectric layer can be separated into parts (e.g., 3×3) for each unit cell, such as to facilitate separate fabrication of each unit cell.

The metallic slotted plane layer 412 includes the (e.g., hourglass-shaped) openings, two of which are labeled 410 (for passing the incoming signal) and 430 (for passing the returning signal, which may or may not be amplified as described herein). In the example representation of FIG. 4, the first opening and second paired openings of the slotted plane for each unit cell are depicted as side-by-side. A unit cell thus includes the resonating metallic pattern (e.g., 306), part of the upper dielectric layer 308 (which can be separate or part of one dielectric shared among unit cells), and the slotted plane portion 412 with RF coupling openings (e.g., 410 and 430).

The next layer beneath the metallic slotted plane layer 412 is a second dielectric layer 444(2), which insulates the metallic slotted plane layer 412 from the metallic microstrip line layer. The metallic microstrip line layer includes the first microstrip line 418 and the second microstrip line 428, which are RF coupled to each unit cell, with the first microstrip line 318 electrically coupled to provide the input signal to the switch 320 by an interlayer via. Accordingly, also shown in FIG. 4 are vias (collectively 446), which couple the first microstrip line 418 and the second microstrip line 428 to the switch 320, and the amplifier and matching circuit 323 output to the second microstrip line 428. Still other interlayer vias can be used to provide power to the surface mounted components and control signaling to toggle the switch states.

The components above and including the first microstrip line 418 and the second microstrip line 428 are supported on the dielectric substrate 445. A metallic ground plane 443 is primarily beneath the dielectric substrate 340.

It should be noted that the devices (subarrays including unit cells) that make up a reconfigurable intelligent surface can receive and reflect incoming electromagnetic signals in the same polarization, including by coupling the radio frequency (RF) energy via dividing and combining circuits, and by selectively amplifying the reflected signal. For either the amplification operating state or the non-amplification operating state, there is sufficient delay due to the length of the various electrical signal lines/couplings such that the incoming signal does not interfere with the reflected outgoing signal, so the polarization can be the same; (if desired, some fixed additional delay can be added, for example, e.g., by having a meandering signal line). Still further, the switch and power amplifier can be shared among an m×n subgroup of unit cells (elements) of a reconfigurable intelligent surface. For example, utilizing a single power amplifier for every 3×3 subgroup of the elements leads to a 9× reduction in the number of power amplifiers. This significant reduction effectively diminishes expenses, power consumption, heat generation, and interference.

Figure 5:
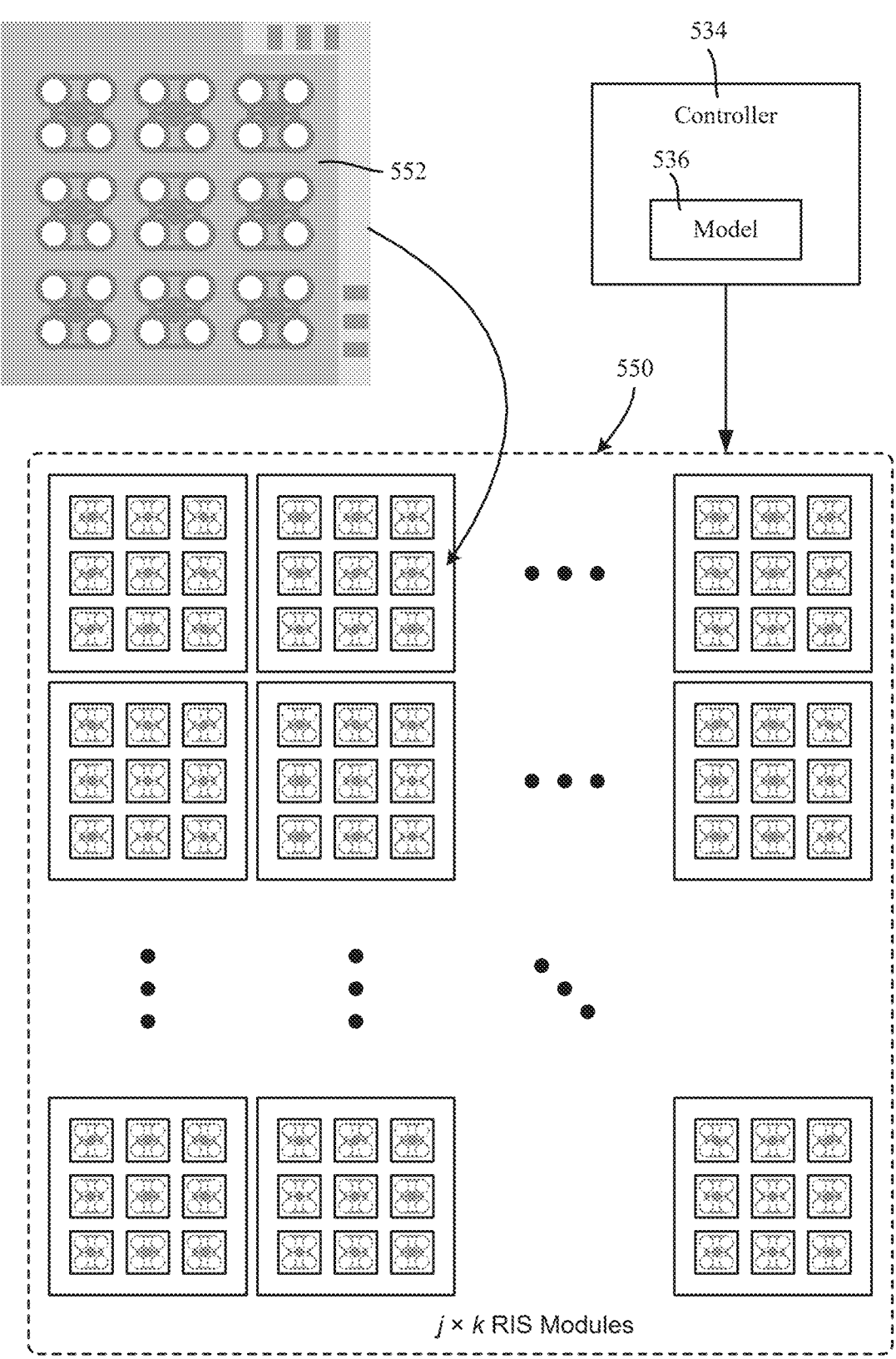
FIG. 5 is top view representation of the example design of a subarray along with a representation of combining subarrays into a larger reconfigurable intelligent surface, in accordance with various example embodiments and implementations of the subject disclosure.

In one implementation, terminals 447 are present at this lower level (insulated from the ground plane as represented in FIG. 5) for coupling DC voltage and switch control signaling to the powered circuitry (e.g., the switch 320, matching circuit 322 and amplifier 324). The terminals facilitate modular construction of subarrays, such that multiple subarray modules can be used to assemble a larger intelligent reconfigurable surface, as generally depicted in the j×k reconfigurable intelligent surface (RIS) 550 of FIG. 5 composed of multiple 3× 3 subarrays of unit cells, e.g., each identical to or similar to the fabricated (top view)

subarray 552, which shows a multi-layer design layout of an example implementation of a reconfigurable intelligent surface subarray.

To summarize, in one example implementation, by integrating power amplifiers and (e.g., single-pole, double-throw) switches, powered by an external DC voltage source, onto the reconfigurable intelligent surface, selective signal amplification is achieved. A layout of the subarrays (e.g., modular) enables the design to be scalable to larger reconfigurable intelligent surface dimensions while maintaining an efficient use of power amplifiers via the concept of having a subarray share a set of powered components. In one example implementation, the subarray of unit cells has layered and integrated components, including four metal layers, namely a resonating patterns layer, a slotted plane layer for signal coupling, a microstrip network for signal combining and dividing, and a ground plane with a reserved area of terminals for coupling the powered components to a DC voltage source. Between every two metal layers, there is an intervening layer of dielectric material.

The power amplifier and its associated impedance matching circuitry, along with the switch, can be surface mounted on the topmost layer. This layer, containing resonating elements, initially captures the incoming signal. Beneath each element, there are two types of slots, namely one for receiving and the other for transmitting. Incoming signal energy is captured through the receiving slots and funneled into the subarray's combining circuit, then directed through inter-layer vias to the surface mounted switch. This switch is controllable to toggle between operational states, such that in one state at one time the switch directs the signal through the power amplifier for amplification, while in another state at another time bypasses the power amplifier. In either state, the signal (amplified or non-amplified) is routed to the dividing circuit, which then redistributes the signal among the reconfigurable intelligent surface elements for re-radiation in the desired direction. In case of amplification, the enhanced signal is equally distributed among the transmitting slots and re-emitted from the top metallic elements.

As shown in FIG. 5, a controller 534, which includes a model 536, is coupled to or incorporated into the reconfigurable intelligent surface 552. The controller 534 controls the state of the switches with respect to selective amplification, and also can, for example, adjust a variable tuning element (e.g., a varactor) on each unit cell to change the unit cell's characteristics, such as phase, and thus can be employed to modify the reflected electromagnetic waves (e.g., via constructive interference from each unit cell's reflected wave). As can be seen, the example design and implementation described herein advances reconfigurable intelligent surface technology through the integration of power amplifiers. However, given that power amplifiers can be significant power consumers, the inclusion of a switch per subarray balances between amplification needs and power efficiency, as determined by an AI-model 536 of the controller 534, particularly in large-scale implementations. Further, because of the high costs and energy demands associated with equipping each reconfigurable intelligent surface element with its own power amplifier, described herein is integrating a single power amplifiers for every subarray of m×n elements. Proper impedance matching between the power amplifiers and the reconfigurable intelligent surface elements is maintained by using a matching circuit to minimize signal reflection. The shape and dimensions of the reconfigurable intelligent surface elements are selected such that they resonate at the desired wireless communication frequency, and the (e.g., hourglass-shaped) slots can achieve a broad bandwidth response in coupling RF energy from the incoming signal and transmitting the output signal.

The incorporation of switches provides refined control over the amplification process, selectively activated by the trained AI-model when needed per subarray, otherwise reflecting the signal as such in the desired direction. The use of selective amplification ensures efficient power usage and significantly boosts the reconfigurable intelligent surface's overall effectiveness. The reconfigurable intelligent surface 550 (e.g., via the controller 534 and model 536 coupled thereto) can intelligently determine the need for signal enhancement or not, and at what overall amplification level, based on varying network conditions, whereby the switch integration helps to conserve energy at one time while enhancing the reconfigurable intelligent surface's adaptability and performance at another time. This results in a versatile, energy-efficient, and effective solution for enhancing signal quality across wireless communication networks.

Depending on the type of model, the AI model's decision output could be a bit pattern representative of which switches to turn on and which to turn off as applied by the controller to the individual switches, or an index to a data structure containing an indexed array of bit patterns representative of which switches to turn on and which to turn off, and so on. The model may have some built-in consideration with respect to smoothing changes (e.g., so as ramp up amplification gradually rather than sharply, such as to compensate for possible outlier signal data), so that there is no going from zero amplification or near-zero amplification to near-maximum or maximum amplification basically instantaneously. The model also may have some built-in consideration with respect to not changing switch states for very small changes (e.g., to avoid toggling a switch and amplifier at a fast rate for very slight ping-ponging percentage changes in signal quality). The model further may have some built-in consideration with respect to distributing the usage of switches and amplifiers to extend the overall life of the reconfigurable intelligent surface.

To summarize, in one example implementation, the reconfigurable intelligent surface structure described here is organized into several 3×3 subarrays, with each subarray containing one switch and one power amplifier. This configuration allows for expansion to larger reconfigurable intelligent surface sizes while efficiently managing the number of power amplifiers used. The design detailed in FIGS. 3 and 4 shows a layering and integration of components within the reconfigurable intelligent surface. The construction of the reconfigurable intelligent surface is divided into four main metal layers, namely the reflecting patterns layer, a slotted plane (or planes layer), the microstrip network layers and a ground plane. Between every two metal layers, there is an intervening layer of dielectric material.

The switch 320 and the power amplifier along with its peripheral circuit 323 can be surface mounted on the topmost layer, which includes the resonating elements that receive the incoming signal. There are two kinds of slots under each element, namely a receiving slot (e.g., first opening 410) and a transmitting slot (e.g., second opening 430). The (e.g., hourglass-shaped) slot openings are used to avoid any sharp discontinuities that limit the performance bandwidth. Energy from the incoming signal is gathered by the receiving slots and then channeled to the subarray's combining circuit (the first microstrip line 418), which is then selectively routed by the switch to the surface mounted power amplifier or to the subarray's dividing circuit (the second microstrip line 428), which distributes the non-amplified signal among the transmitting slots, whereby the signal is re-radiated from the top metallic elements. If amplification is selected, the dividing circuit (the second microstrip line 428) distributes the amplified signal among the transmitting slots, whereby the amplified signal is re-radiated from the top metallic elements.

Note that in one implementation, the design of the power dividing and combining circuit as described herein, along with the dielectric substrate, have been engineered to align with a characteristic impedance of 50 Ohms, targeting an operating frequency range centered at 28 GHz. In one example implementation, the thickness, dielectric constant, and other characteristics of the dielectric layers are chosen such that an impedance of 50 Ohms is maintained. Additionally, attention has been paid to the spacing between the microstrip lines of both the combining and dividing circuits, ensuring optimal separation to prevent any undesirable coupling between them.

Figure 6:
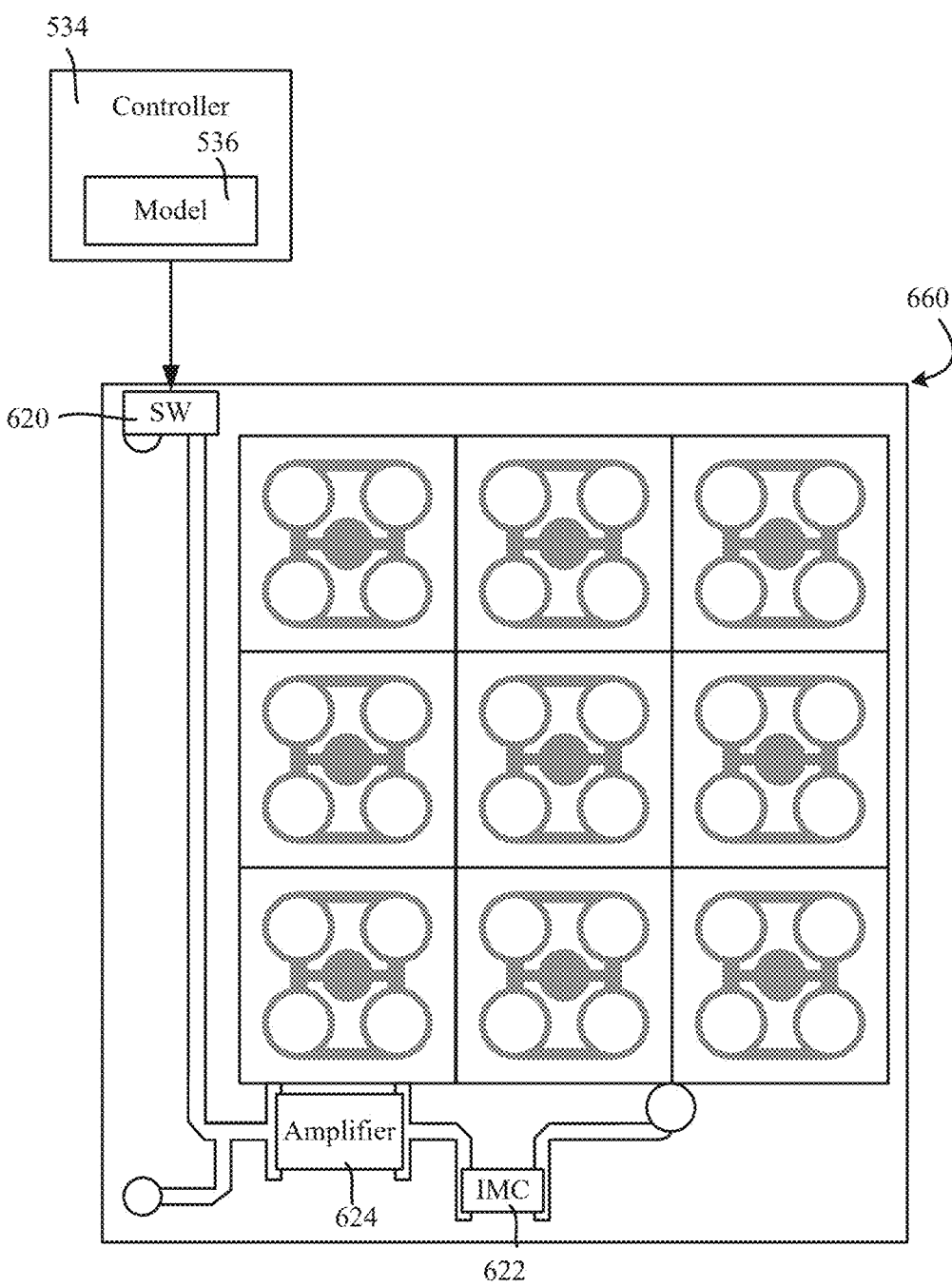
FIGS. 6-8 are top view representations showing various combinations of the layers of FIG. 4, in accordance with various example embodiments and implementations of the subject disclosure.
Figure 7:
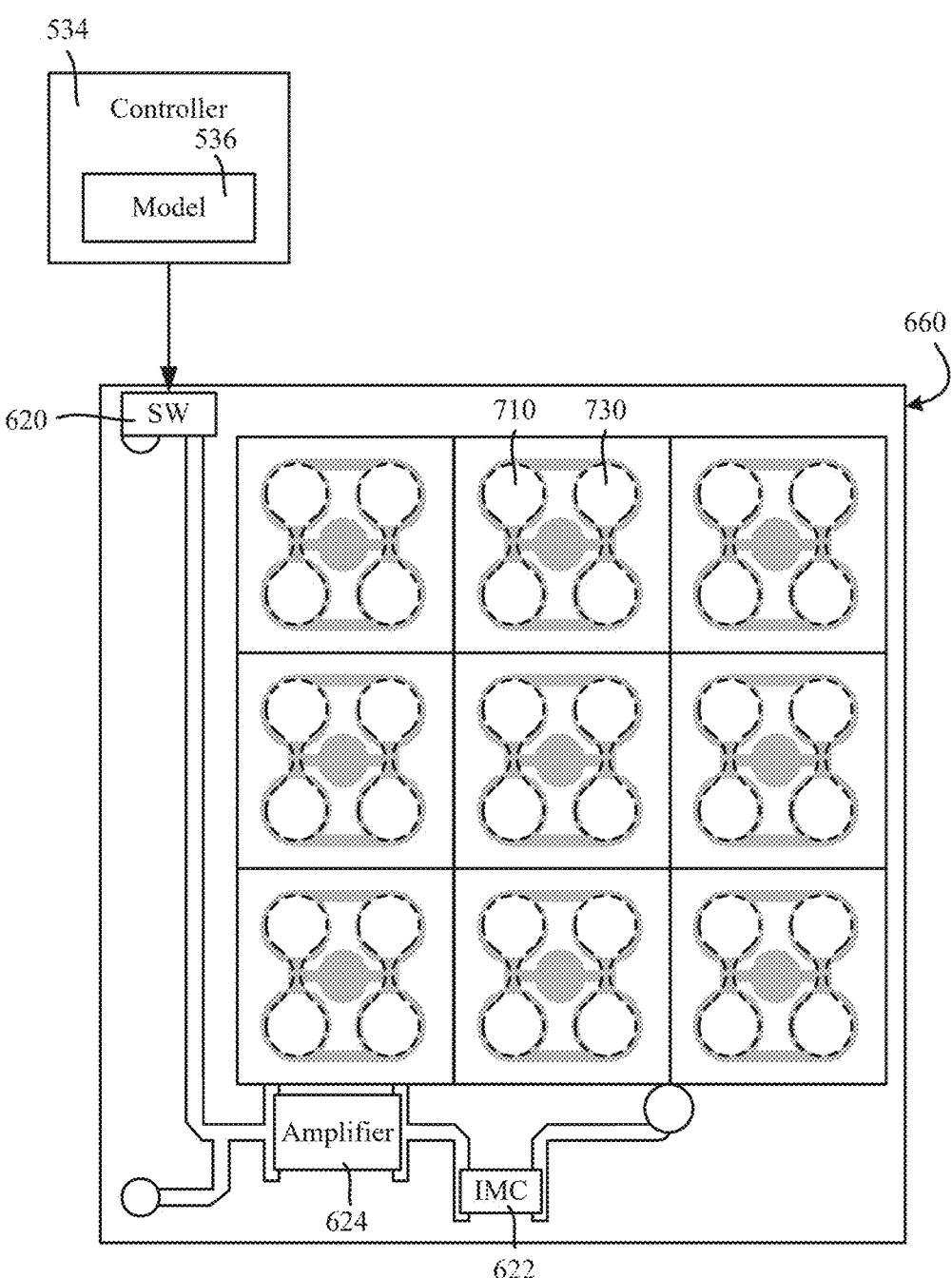
Figure 8:
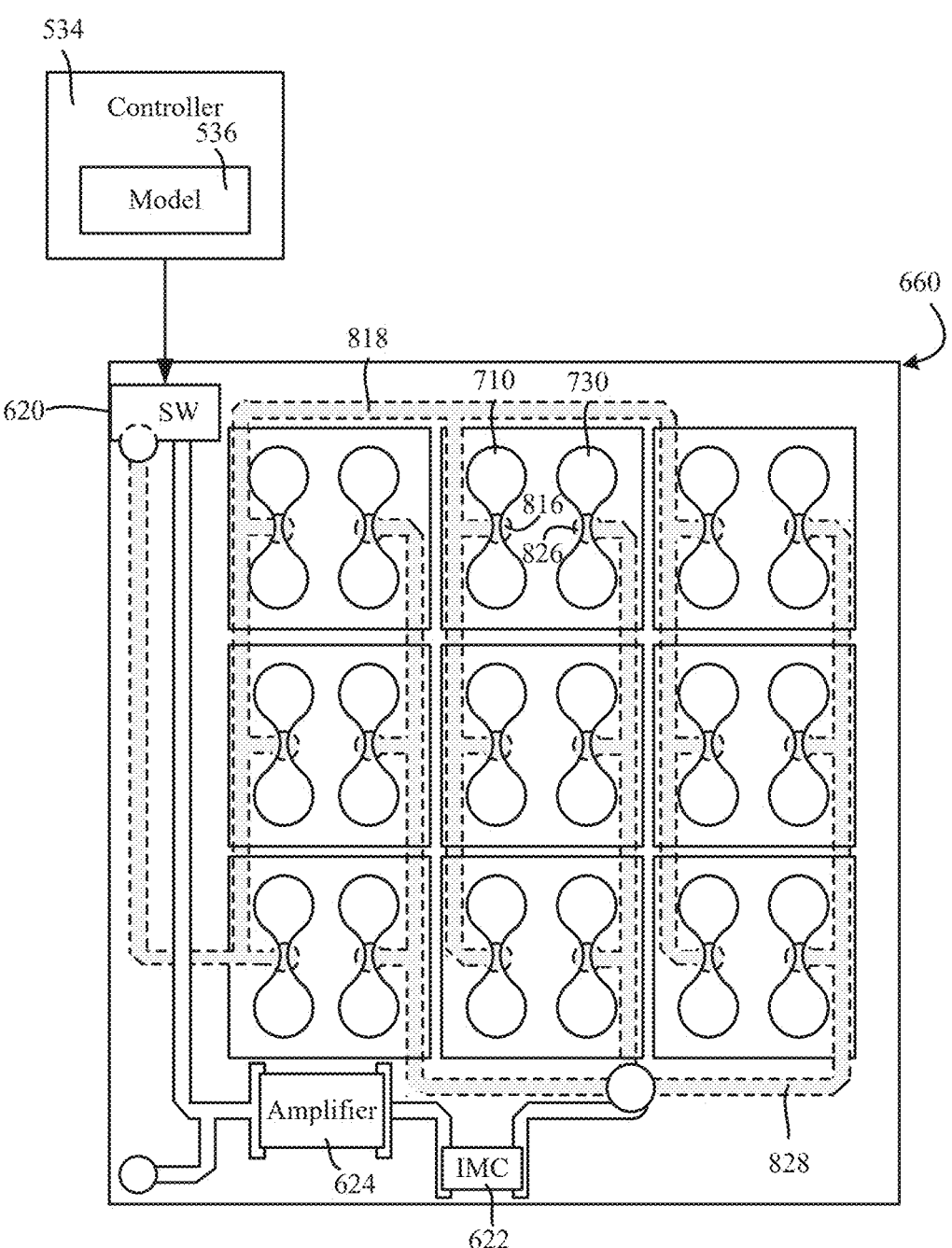

FIGS. 6-8 are top view representations of selected layers/levels of a 3×3 subarray 660 of nine unit cells generally corresponding to the example subarray 552 of FIG. 5. A switch (SW) 620, impedance matching circuit 622 and power amplifier 624 are shown as part of the subarray 660 in FIGS. 6-8; note that the positions of the impedance matching circuit 622 and power amplifier 624 relative to the switch 620 can be changed.

FIG. 7 is a top view corresponding to FIG. 6 that depicts the openings in the slotted plane layers beneath the top (resonating metallic pattern) layers and the upper dielectric layer. In this representation, the upper dielectric layer(s) are omitted to facilitate viewing of the slotted plane layers and their respective openings. One hourglass-shaped opening 710 for the incoming signal and one hourglass-shaped opening 730 for the outgoing (selectively amplified or non-amplified) signal are labeled in FIG. 7, although alternative shapes for the openings can be used.

FIG. 8 is a top view corresponding to FIGS. 6 and 7 that depicts the next layer beneath the slotted plane layers and the lower dielectric layer and above the substrate, that is, FIG. 8 shows the openings in the slotted plane layers above the level of the first and second microstrip lines 818 and 828, respectively. In this representation, the lower dielectric layer is omitted to facilitate viewing of the first and second microstrip lines.

As can be seen in FIG. 8, the first and second microstrip lines 818 and 828 (shaded and dashed when depicted below the top layer) are shared by each unit cell of the subarray. As also can be seen, the first microstrip line 818 has respective contacts/terminals that align with the respective centers of the respective first openings in the unit cells' respective slotted plane layers. Thus, for example, the contact labeled 816 (of the first microstrip line 818) aligns with the first opening 710, while the contact labeled 826 (of the second microstrip line 828) aligns with the second opening 730. In this way, the incoming signal is RF energy coupled to the switch 620 for selective amplifier input, while the outgoing (possibly amplified) signal at the contacts (including 826) is RF energy coupled through the aligned second openings (including 830).

To reiterate, the incoming signal and the redirected outgoing signal can be of the same polarization, because the length of the various conducting lines are sufficiently long to add delay to the redirected outgoing signal, without creating unwanted harmonics whether the signal is amplified or not. Notwithstanding, a delay line can be added, such as, for example, a line having some portion that meanders on the line from the first microstrip line 828 to the switch 620 to increase delay a desired, fixed amount; (a digital delay is also feasible).

The design and evaluation of both the unit cell and the reconfigurable intelligent surface panel have been performed through comprehensive full wave simulations using 3D electromagnetic (EM) simulation software (e.g., Ansys HFSS). The results are shown in the graphical representations of FIGS. 9 and 10.

Figure 9:
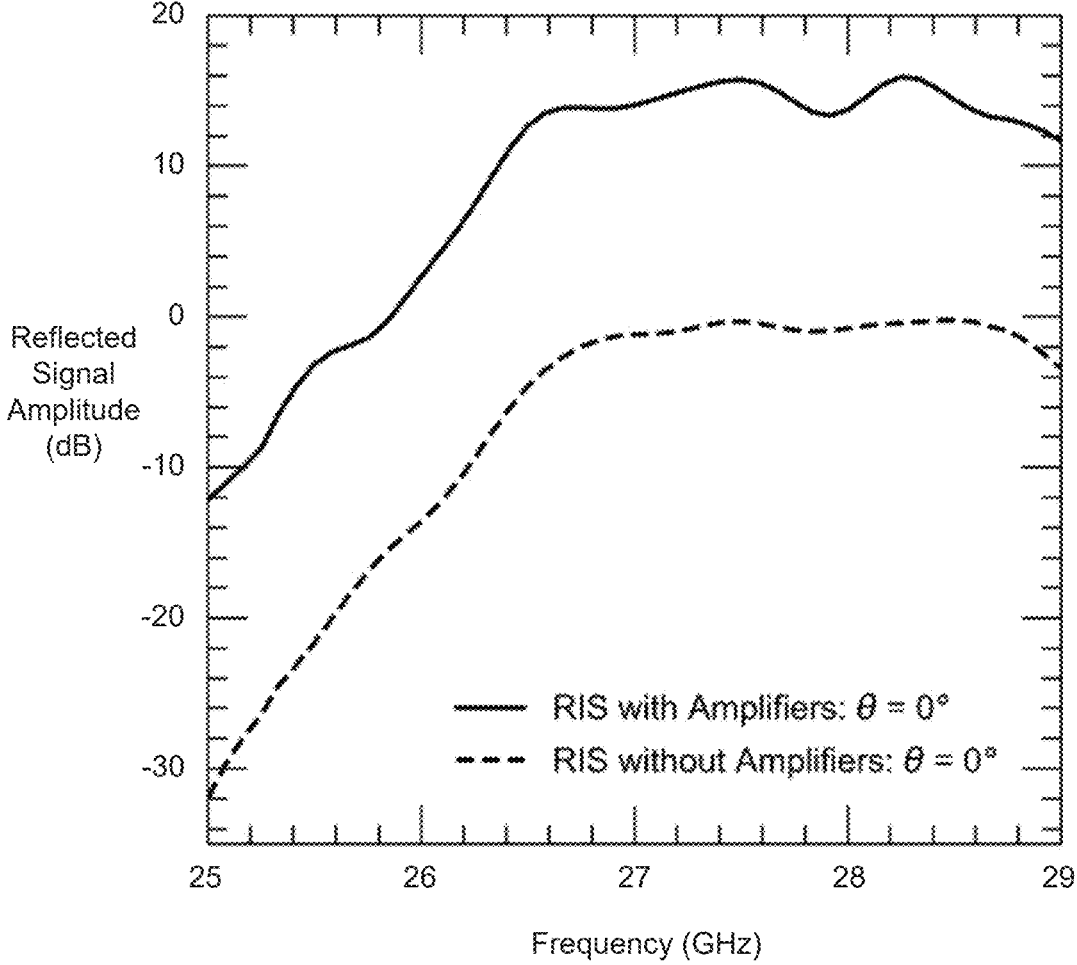
FIG. 9 is a graphical representation comparing an example reconfigurable intelligent surface with selective amplification (from no amplification to full amplification) as described herein when the incoming RF signal is normal to the reconfigurable intelligent surface, in accordance with various example embodiments and implementations of the subject disclosure.

When the incident signal is normal to the surface of the evaluated reconfigurable intelligent surface, which means that the angle of arrival (AoA), 0 is 0°, FIG. 9 shows the significant difference in reflected signal amplitude for a reconfigurable intelligent surface with and without amplification. The passive gain of the evaluated reconfigurable intelligent surface lies between −2 dB and 0 dB from 26.5 GHz to 29 GHz, while the full active gain is between 12 dB to 16 dB for the same frequency range. As is understood, selective amplification allows for various other amplitudes between the passive gain amplitude and the full active gain.

Figure 10:
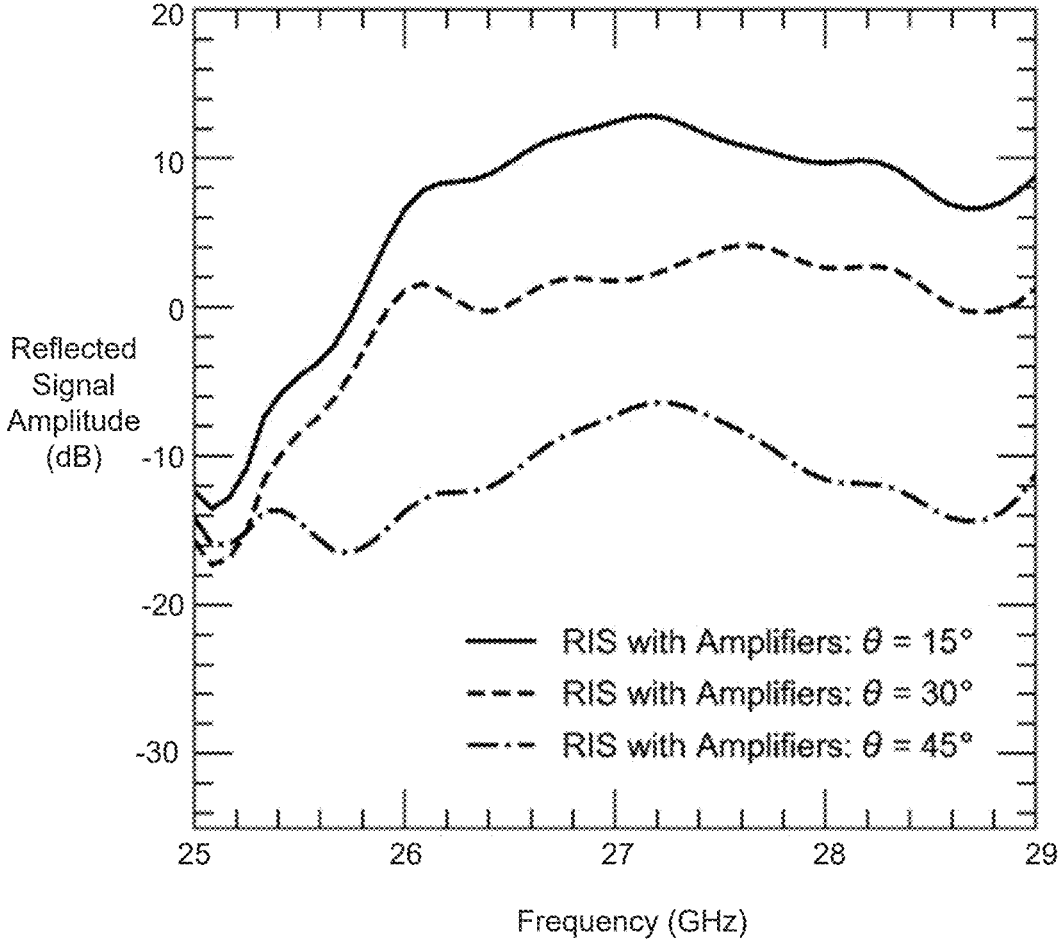
FIG. 10 is a graphical representation showing simulated reflected signal amplitudes for the incoming signal with angles of arrival of $\theta=15°$, $30°$, and $45°$, in accordance with various example embodiments and implementations of the subject disclosure.

FIG. 10 shows the full active gain from a reconfigurable intelligent surface for the incoming signal AoAs (θ) of 150, 300, and 45°. More specifically, for the incident angle of 15°, the reflected signal amplitude is 9.5±3 dB for the frequency band 26 GHz to 29 GHz. When the incoming signal hits the surface at 30°, the amplified reflected signal amplitude is 2±2.1 dB. For the incident angle of 45°, the reflected signal amplitude is 10±4 dB for the frequency range 26 GHz to 29 GHz.

Figure 11:
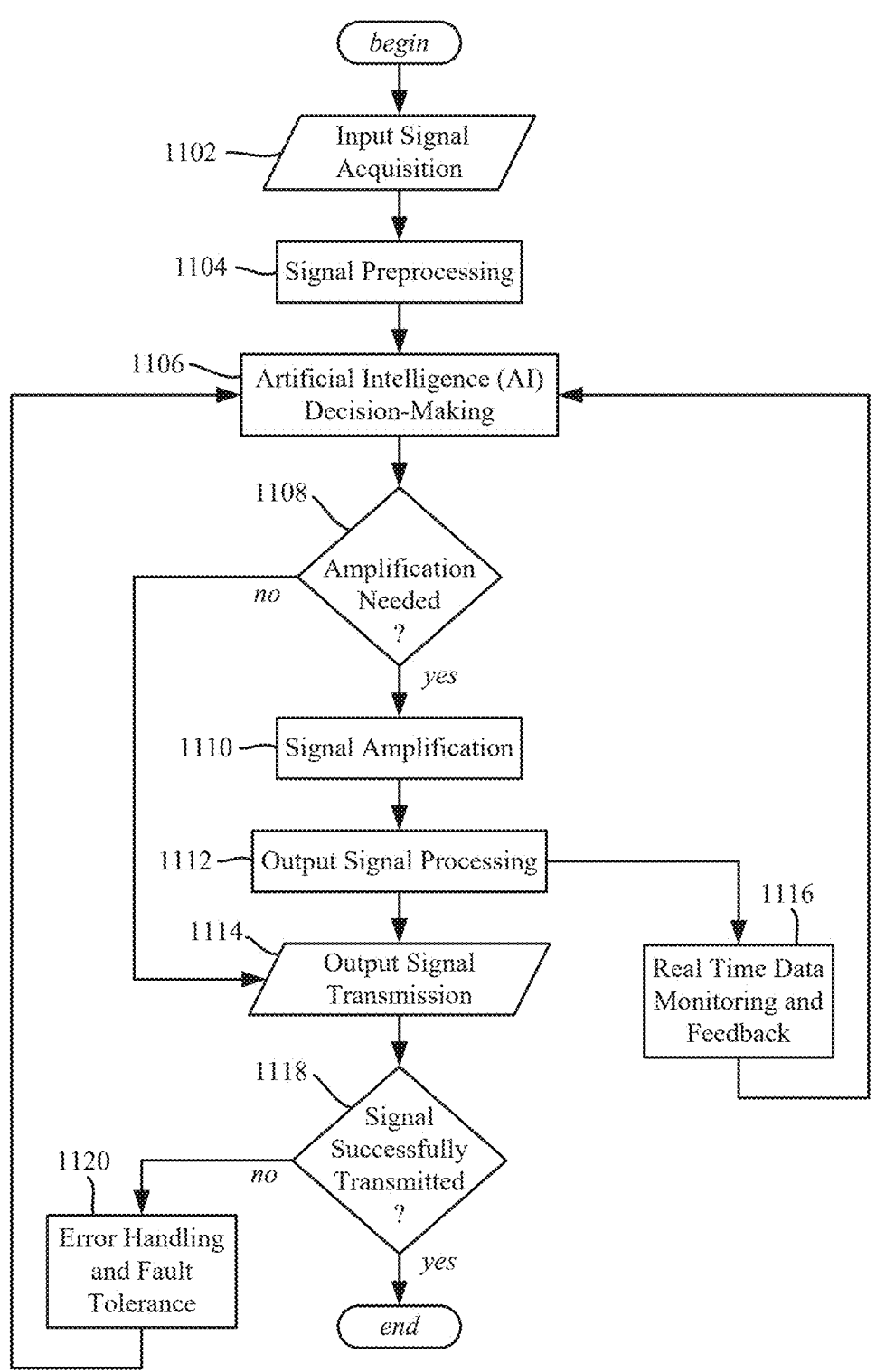
FIG. 11 is a flow diagram showing example operations related to selectively amplifying, per subarray of unit cells, an incoming signal, in accordance with various example embodiments and implementations of the subject disclosure.

FIG. 11 is a flow diagram showing example operations related to selective signal amplification, beginning at operation 1102 where the incoming signal is acquired at the reconfigurable intelligent surface. Operation 1104 represents performing any appropriate signal preprocessing, such as to clean and condition the incoming signal, which may include noise reduction, filtering and/or digitization.

Operation 1106 represents the decision-making by the trained AI model, e.g., the AI model in the controller learns from historical data in conjunction with the current signal data (and possibly other data such as network demand and/or environmental conditions) whether to amplify the incoming signal or not. Operation 1108 evaluates the decision from the model. Note that operations 1108, 1110, 1112, 1114 and 1116 are on a per-subarray basis; that is, these operations are performed (such as in parallel) for each subarray that is capable of selective amplification. For purposes of brevity, these operations are described with reference to one particular subarray.

If the decision at operation 1108 is that amplification is not needed, operation 1108 branches to operation 1114, basically bypassing amplification. Otherwise, as generally represented by operation 1110, signal amplification occurs, which involves activating hardware components including the subarray's amplifier for changing the properties of the reconfigurable intelligent surface module/panel. That is, in the example implementations described herein, the switch for this particular subarray is controlled (or maintained) to operate in the first operational switch state that couples the incoming signal to the amplifier circuitry.

Prior to outputting an amplified signal, operation 1112 performs any appropriate signal processing. That is, after amplification the signal can be processed if necessary, such as with respect to additional filtering or modulation, for example.

Whether amplified or not, operation 1114 represents outputting the signal transmission. Note that this redirects (e.g., reflects) the processed signal in the desired direction corresponding to each controlled phase of each unit cell of this subarray.

Operations 1116, 1118 and 1120 are directed to improving the AI model's decision-making over time, e.g., by retraining/self-training of the model. Operation 1116 is directed to real-time data monitoring and feedback based on the output signal after any output signal processing at operation 1112.

Operations 1118 (performance parameter evaluation) and 1120 (feedback loop) are directed to error handling and fault tolerance that depends on whether the signal (as a whole, combined from the surface's multiple subarrays) was successfully transmitted (e.g., reflected) in the intended manner. For example, desired performance parameters are evaluated with respect to the actual performance parameters measured at a receiver, including for example, whether the beam was received with RSSI and SNR values that meet the desired performance parameters. If not, the model learns that more subarrays need to be activated with respect to amplification in the current conditions, up to the maximum possible amplification. Conversely, if the desired performance parameters were far exceeded, the transmission can be considered unsuccessful (due to unnecessary amplification), whereby the model learns that less subarrays can be activated with respect to amplification in the current conditions, thereby saving energy.

Figure 12:
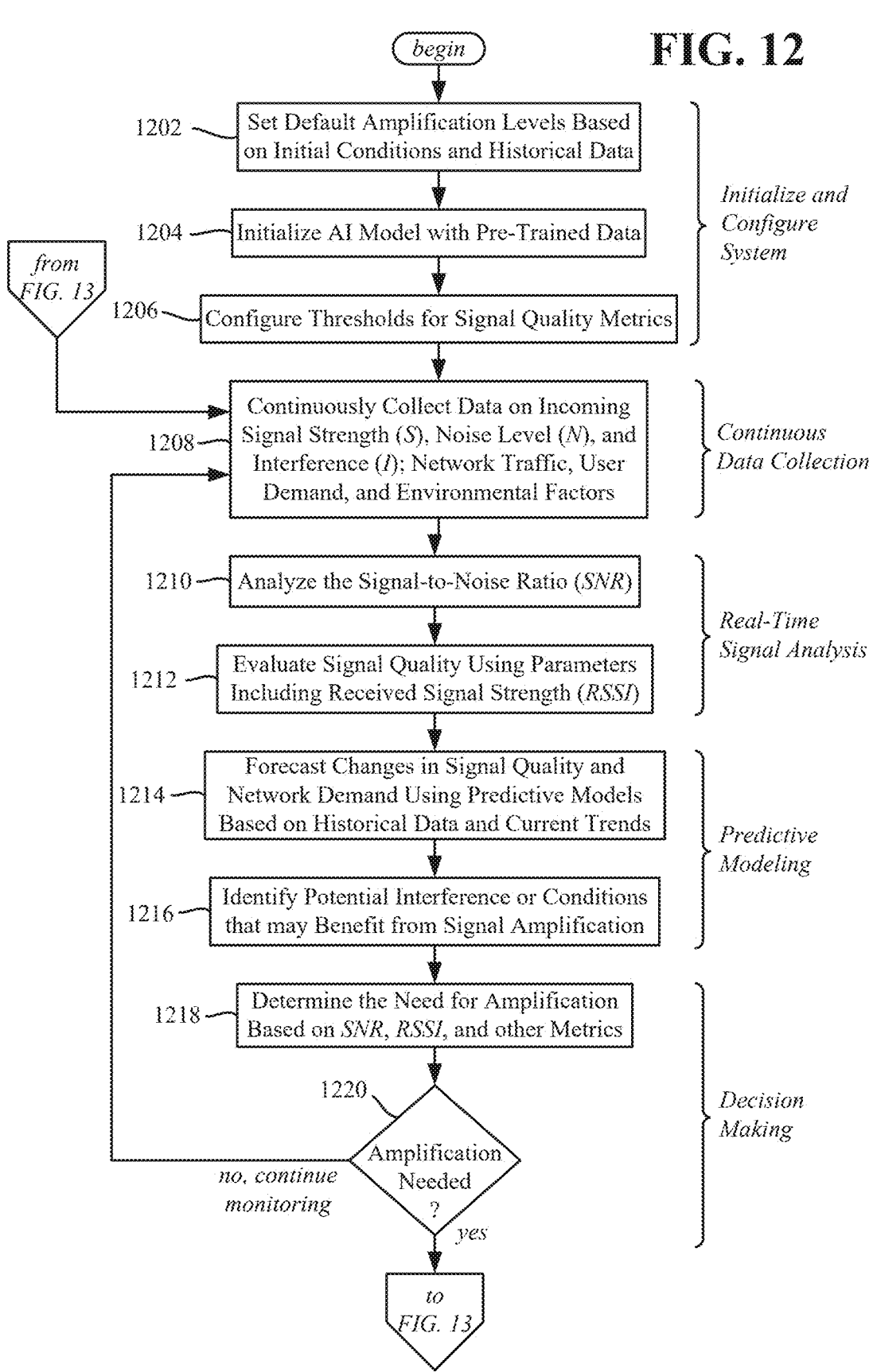
FIGS. 12 and 13 comprise a flow diagram showing example operations related to signal amplification decision logic, in accordance with various example embodiments and implementations of the subject disclosure.
Figure 13:
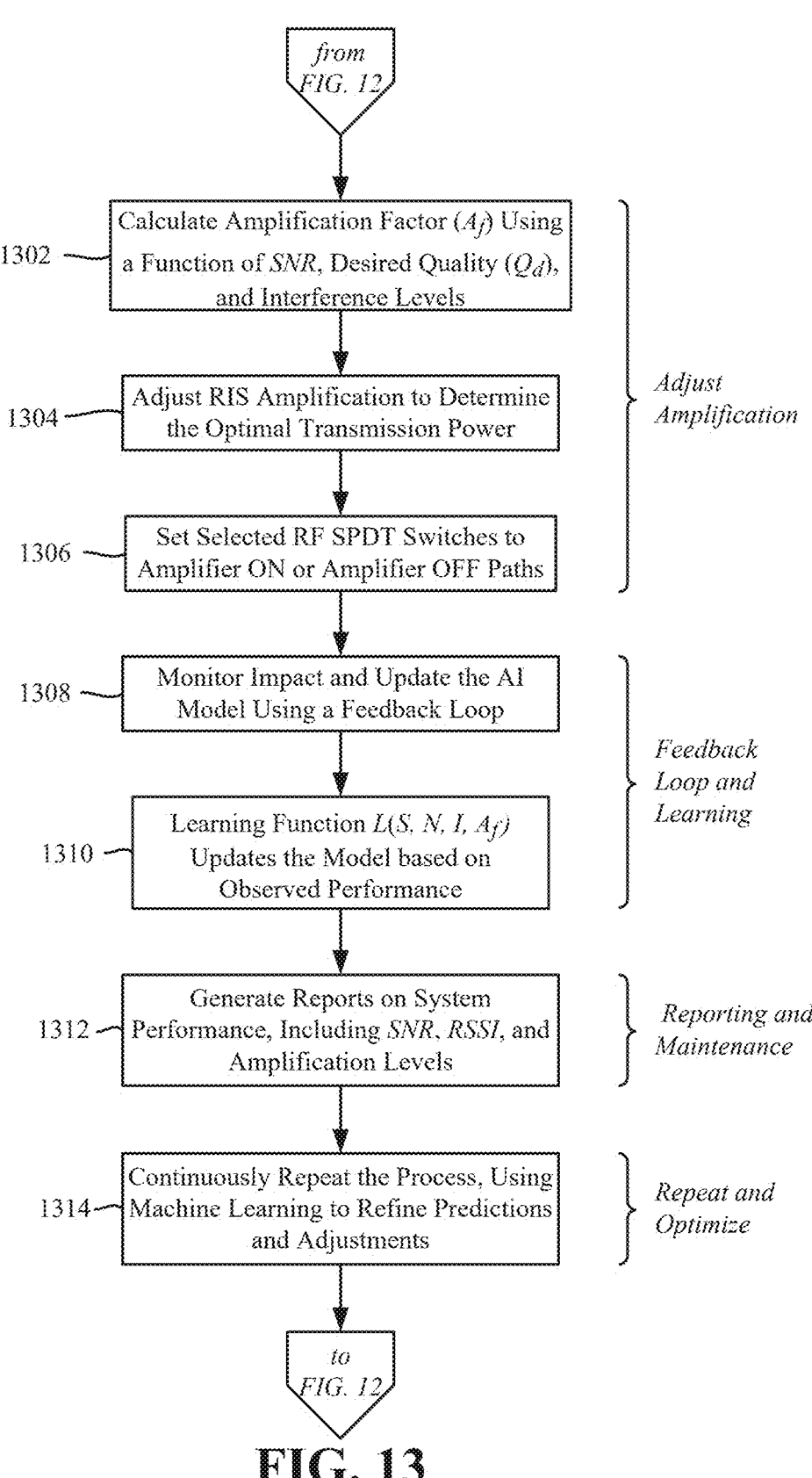

FIGS. 12 and 13 comprise a flow diagram showing operations related to the model and the signal amplification decision using AI, e.g., as run in tile controller or by a centralized controller. Operations 1202, 1204 and 1206 are generally directed to initializing and configuring the system. Operation 1202 initializes the AI model with pre-trained data (as available). Operation 1204 sets default amplification levels based on initial conditions and historical data. Operation 1206 configures thresholds for signal quality metrics (e.g., signal strength threshold, noise level threshold, and so on).

Operation 1208 represents continuous data collection, that is, this operation represents continuously collecting data on incoming signal strength(S), noise level (N), and interference (I). Also, data can be collected with respect to network traffic, user demand, and environmental factors (including weather conditions, time of day, and the like). Note that some data need not be continuously collected but instead can be occasionally sampled, e.g., weather conditions every few minutes, time of day every so often for synchronization, and so on.

Operations 1210 and 1212 are generally directed to real-time signal analysis. Operation 1210 analyzes the signal-to-noise ratio (SNR):

$$SNR = \frac{S}{N}.$$

operation 1212 evaluates the signal quality using parameters including received signal strength (RSSI), e.g., $RSSI = -10*n*\log_{10}(d) + A$, where n is the path-loss exponent, d is the distance, and A is a constant.

Operations 1214 and 1216 represent predictive modeling operations. Operation 1214 represents forecasting changes in signal quality and network demand using predictive models based on historical data and current trends. Operation 1216 represents identifying any potential interference or other adverse conditions during which the signal may benefit from signal amplification.

Operations 1218 and 1220 are generally directed to decision making by the model. Operation 1218 determines the need for amplification based on SNR, RSSI, and other metrics. If no amplification (or change to the existing total amplification level) is needed, operation 1220 returns to operation 1208 to continue monitoring.

Otherwise, the process continues to FIG. 13, where operations 1302 and 1304 adjust the amplification. More particularly, operation 1302 calculates a required amplification factor ($A_f$) using a function of SNR, desired quality ($Q_d$), and interference levels I: $A_f = f(SNR, Q_d, I)$. Operation 1304 adjusts the reconfigurable intelligent surface amplification level to determine the optimal transmission power, in which operation 1306 selectively sets the individual respective per-subarray RF (SP-DT) switches to their respective amplifier ON or amplifier OFF paths.

Operations 1308 and 1310 represent the feedback loop and learning operations. Operation 1308 monitors the impact of the selected application, and updates the AI model using a feedback loop. Operation 1310 represents operating a learning function L (S, N, I, $A_f$), which updates the model based on observed performance.

Operation 1312 is directed to reporting and maintenance, and generates reports on system performance, including SNR, RSSI, and amplification levels. Operation 1314 repeats and optimizes the overall monitoring and amplification process, e.g., returning to operation 1208 of FIG. 12 to continuously repeat the process, using machine learning to refine predictions and adjustments over time.

Figure 14:
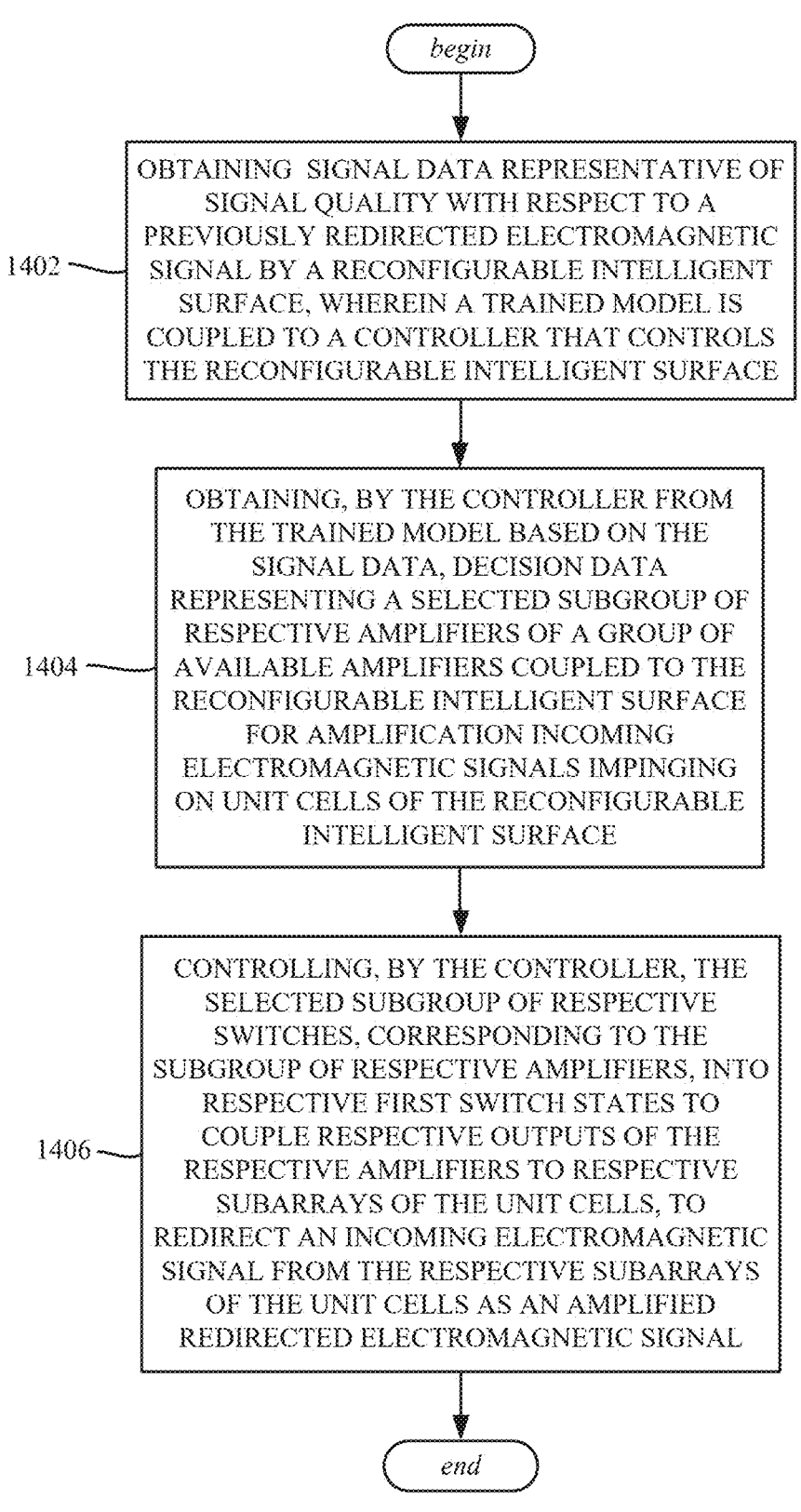
FIG. 14 is a flow diagram showing example operations related to controlling a selected subgroup of switches to couple amplifiers' outputs to subarrays of unit cells that redirect an incoming electromagnetic signal as an amplified redirected electromagnetic signal, in accordance with various example embodiments and implementations of the subject disclosure.

One or more concepts described herein can be embodied in a system, such as represented in the example operations of FIG. 14, and for example can include at least one memory that stores computer executable components and/or operations, and at least one processor that executes computer executable components and/or operations stored in the memory. Example operations can include operation 1402, which represents obtaining signal data representative of signal quality with respect to a previously redirected electromagnetic signal by a reconfigurable intelligent surface, wherein a trained model is coupled to a controller that controls the reconfigurable intelligent surface. Example operation 1404 represents obtaining, by the controller from the trained model based on the signal data, decision data representing a selected subgroup of respective amplifiers of a group of available amplifiers coupled to the reconfigurable intelligent surface for amplification incoming electromagnetic signals impinging on unit cells of the reconfigurable intelligent surface. Example operation 1406 represents controlling, by the controller, the selected subgroup of respective switches, corresponding to the subgroup of respective amplifiers, into respective first switch states to couple respective outputs of the respective amplifiers to respective subarrays of the unit cells, to redirect an incoming electromagnetic signal from the respective subarrays of the unit cells as an amplified redirected electromagnetic signal.

The trained model can be incorporated into logic of the controller.

The trained model can be trained based on historical data representative of historical signal qualities with respect to previously redirected electromagnetic signals.

The system can include respective impedance matching circuits coupled to the respective amplifiers.

Further operations can include feeding back monitoring data corresponding to the amplified redirected electromagnetic signal for further training of the trained model.

Further operations can include feeding back error data, corresponding to an unsuccessful transmission of the amplified redirected electromagnetic signal, for further training of the trained model.

A respective subarray of the respective subarrays can be configured to receive the incoming electromagnetic signal to obtain a received electromagnetic signal, couple the received electromagnetic signal to a first microstrip line shared by respective unit cells of the respective subarray; the first microstrip line can be coupled via a respective switch of the respective switches, in a first respective switch state of the respective first switch states, to an input of a respective amplifier of the respective amplifiers, and the respective switch and the respective amplifier can be shared by the respective unit cells of the respective subarray. The respective subarray of the respective subarrays can be configured to couple the output of the respective amplifier as an amplified electronic signal to a second microstrip line shared by the respective unit cells of the respective subarray; the amplified electromagnetic signal can be coupled from the second microstrip line to respective resonating metallic portions of the respective unit cells to redirect the amplified electromagnetic signal from the respective subarray as a respective portion of the redirected amplified electromagnetic signal.

The respective unit cells of the respective subgroup can couple the received electromagnetic signal to the first microstrip line via first respective openings of a slotted plane layer of the respective unit cells of the respective subarray, and wherein the respective unit cells of the respective subarray couple the amplified electromagnetic signal to the respective resonating metallic portions via second respective openings of the slotted plane layer.

The received electromagnetic signal can be a first received electromagnetic signal, the respective subarray can be further configured to receive the incoming electromagnetic signal to obtain a second received electromagnetic signal, the respective subarray can be further configured to couple the second received electromagnetic signal to the first microstrip line, and the first microstrip line can be coupled via the respective switch, in a second respective switch state, to bypass the input of the respective amplifier and couple the first microstrip line to the second microstrip line, to redirect the second received electromagnetic signal from the respective subarray as a respective non-amplified portion of the redirected amplified electromagnetic signal.

Obtaining the decision data representing the selected subgroup of the respective amplifiers can be forecasted decision data by the trained model based on at least one of: predicted changes in signal quality data, or predicted network demand data representative of a predicted demand for network resources.

Figure 15:
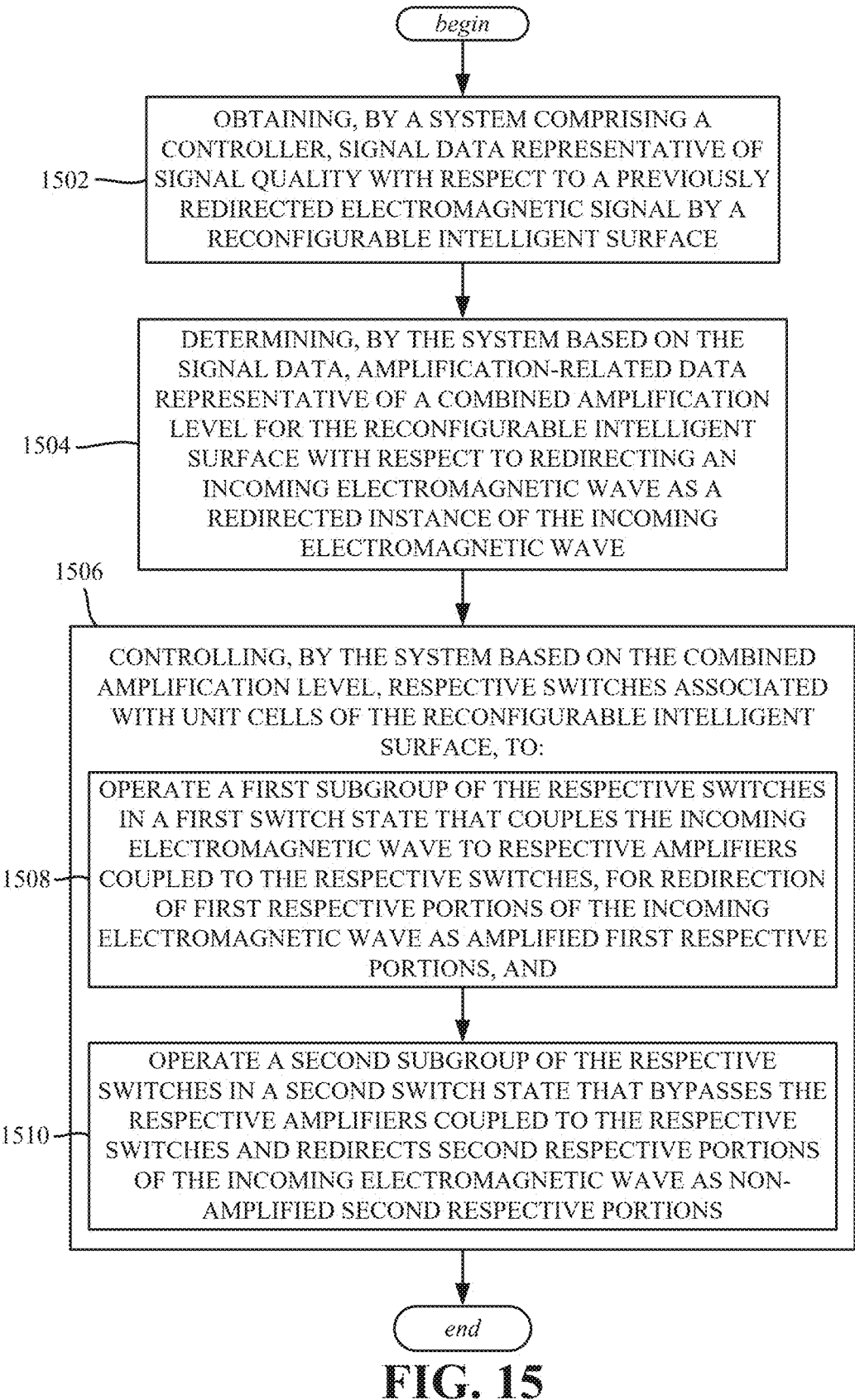
FIG. 15 is a flow diagram showing example operations related to controlling switches to operate one subgroup in a first switch state that couples an incoming electromagnetic wave to amplifiers, and operate a different subgroup in a second switch state that bypasses the respective amplifiers, in accordance with various example embodiments and implementations of the subject disclosure.

One or more example implementations and embodiments, such as corresponding to example operations of a method, are represented in FIG. 15. Example operation 1502 represents obtaining, by a system that can include a controller, signal data representative of signal quality with respect to a previously redirected electromagnetic signal by a reconfigurable intelligent surface. Example operation 1504 represents determining, by the system based on the signal data, amplification-related data representative of a combined amplification level for the reconfigurable intelligent surface with respect to redirecting an incoming electromagnetic wave as a redirected instance of the incoming electromagnetic wave. Example operation 1506 represents controlling, by the system based on the combined amplification level, respective switches associated with unit cells of the reconfigurable intelligent surface, to operate a first subgroup of the respective switches in a first switch state that couples the incoming electromagnetic wave to respective amplifiers coupled to the respective switches, for redirection of first respective portions of the incoming electromagnetic wave as amplified first respective portions (block 1508), and operate a second subgroup of the respective switches in a second switch state that bypasses the respective amplifiers coupled to the respective switches and redirects second respective portions of the incoming electromagnetic wave as non-amplified second respective portions (block 1510).

The unit cells can be arranged as respective subarrays of unit cells, each respective subarray of the respective subarrays can share a respective switch of the respective switches coupled to a respective amplifier of the respective amplifiers, and controlling the respective switches can include independently controlling each respective switch of each respective subarray.

Determining the combined amplification level can include inputting the signal data into a trained model of the system, and obtaining the amplification-related data as output from the trained model.

Further operations can include training, by the system, the trained model based on historical data representative of past signal data representative of past signal qualities with respect to previously redirected electromagnetic signals by the reconfigurable intelligent surface.

Further operations can include obtaining, by the system, monitoring data corresponding to the amplified first respective portions, and feeding back, by the system, the monitoring data for subsequent learning by the trained model.

Further operations can include obtaining, by the system, failure data corresponding to the amplified first respective portions, and feeding back, by the system, the monitoring data for subsequent learning by the trained model.

Further operations can include obtaining, by the system, error data corresponding to an unsuccessful transmission of the redirected instance of the incoming electromagnetic wave, and feeding back, by the system, the error data for subsequent learning by the trained model.

One or more example embodiments can be embodied in a system, such as described and represented herein. The system can include a reconfigurable intelligent surface configured to redirect incoming electromagnetic signals, the reconfigurable intelligent surface comprising respective subarrays of unit cells, a controller coupled to a trained model and coupled to the respective subarrays via respective switches, and respective amplifiers configured to be selectively coupled to the respective subarrays via the respective switches. The controller can be configured to obtain signal data representative of a previously redirected electromagnetic signal by the reconfigurable intelligent surface, input the signal data into the trained model to obtain an output representative of respective individual switch states of the respective switches, and control the respective individual switch states of the respective switches based on the output to selectively couple zero or more of the respective amplifiers, to establish an amplification level of an outgoing electromagnetic signal, redirected from the reconfigurable intelligent surface, based on an incoming electromagnetic signal.

A respective subarray of the respective subarrays can be radio frequency coupled to a first microstrip line, shared by respective unit cells of the respective subarray, that receives the incoming electromagnetic signal, the first microstrip line can be selectively coupled via a respective switch of the respective switches to a second microstrip line, shared by the unit cells of the respective subarray, or to an input of a respective amplifier of the respective amplifiers having an output coupled to the second microstrip line, and the second microstrip line can be radio frequency coupled to respective resonating metallic portions of the respective unit cells to redirect a portion of the outgoing electromagnetic signal as an amplified portion of the electromagnetic signal or a non-amplified portion of the electromagnetic signal depending on the respective individual switch state of the respective switch as controlled by the controller.

The first microstrip line can be radio frequency coupled to receive the incoming electromagnetic signal through respective first openings, aligned with the respective unit cells, in a slotted plane, and the second microstrip line can be radio frequency coupled to the respective resonating metallic through respective second openings in the slotted plane.

As can be seen, the technology described herein is directed to an intelligent reconfigurable service based on devices for receiving and reflecting an electromagnetic signal, in which the reflected electromagnetic signal can be selectively amplified to a determined level, (including not amplified). The reconfigurable intelligent surface is attached to an AI-powered controller that processes data from the network and makes the decision if amplification is appropriate or not. The AI model determines the optimal amplification levels and the specific subarrays of the reconfigurable intelligent surface that are to be activated with respect to amplification. The subarrays are individually activated or deactivated by controlling a switch associated with each subarray. The AI-powered controller also sends commands to the reconfigurable intelligent surface to adjust the phase and amplitude of the reflected signals. In this way, a reconfigurable intelligent surface can be dynamically configured to focus signals in specific directions, providing beamforming capabilities; combined with AI, this can lead to precise signal control.

In one implementation, the incoming EM wave on a subarray of reconfigurable intelligent surface elements is coupled to a microstrip circuit. If amplification is appropriate, coupled RF energy goes through a power amplifier before retransmission. If not, the coupled RF energy is retransmitted without amplification. This operation is controlled by AI to ensure efficient power usage.

The design results in a versatile and power-smart implementation for improving signal quality in wireless communication networks, balancing between lowering costs, enhancing functionality, and managing system intricacy. Each switch allows for dynamic signal amplification, providing an efficient and adaptable solution in varying signal conditions. The technology described herein overcomes the previous challenges of signal power loss and double fading, through a compact, monolithic structure that seamlessly integrates switches and power amplifiers, along with their matching networks in an intelligent reconfigurable surface module.

By adding artificial intelligence (AI) to a controller connected to the reconfigurable intelligent surface, signal amplification decisions enhance the operational adaptability, efficiency, and effectiveness of wireless communication systems. The AI model can adapt to changing environmental conditions and signal characteristics in real-time, adjusting amplification levels based on factors including interference, distance to the receiver, signal strength, for optimizing communication quality. The AI model can optimize power consumption by activating amplifiers only when deemed necessary, i.e., the AI model optimizes the system for various objectives, including signal quality, energy efficiency, and network coverage, which overall reduces energy costs in infrastructure deployments. Cost Savings also can be obtained because AI-powered amplification control can reduce the need for excessive hardware, such as fixed amplifiers, which can be costly and inflexible.

Amplifiers in the reconfigurable intelligent surface can proactively compensate for signal losses and improve signal propagation, particularly in scenarios with obstacles or signal blockage. End-users benefit from improved signal quality and reliability, leading to better user experiences in wireless communication.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
obtaining signal data representative of signal quality with respect to a previously redirected electromagnetic signal by a reconfigurable intelligent surface, wherein a trained model is coupled to a controller that controls the reconfigurable intelligent surface;
obtaining, by the controller from the trained model based on the signal data, decision data representing a selected subgroup of respective amplifiers of a group of available amplifiers coupled to the reconfigurable intelligent surface for amplification incoming electromagnetic signals impinging on unit cells of the reconfigurable intelligent surface; and
controlling, by the controller, a subgroup of respective switches, corresponding to the selected subgroup of respective amplifiers, into respective first switch states to couple respective outputs of the respective amplifiers to respective subarrays of the unit cells, to redirect an incoming electromagnetic signal from the respective subarrays of the unit cells as an amplified redirected electromagnetic signal.

2. The system of claim 1, wherein the trained model is incorporated into logic of the controller.

3. The system of claim 1, wherein the trained model is trained based on historical data representative of historical signal qualities with respect to previously redirected electromagnetic signals.

4. The system of claim 1, further comprising:
respective impedance matching circuits coupled to the respective amplifiers.

5. The system of claim 1, wherein the operations further comprise feeding back monitoring data corresponding to the amplified redirected electromagnetic signal for further training of the trained model.

6. The system of claim 1, wherein the operations further comprise feeding back error data, corresponding to an unsuccessful transmission of the amplified redirected electromagnetic signal, for further training of the trained model.

7. The system of claim 1, wherein a respective subarray of the respective subarrays is configured to:
receive the incoming electromagnetic signal to obtain a received electromagnetic signal;
couple the received electromagnetic signal to a first microstrip line shared by respective unit cells of the respective subarray, wherein the first microstrip line is coupled via a respective switch of the subgroup of respective switches, in a first respective switch state of the respective first switch states, to an input of a respective amplifier of the respective amplifiers, wherein the respective switch and the respective amplifier is shared by the respective unit cells of the respective subarray; and couple the output of the respective amplifier as an amplified electronic signal to a second microstrip line shared by the respective unit cells of the respective subarray, wherein the amplified electromagnetic signal is coupled from the second microstrip line to respective resonating metallic portions of the respective unit cells to redirect the amplified electromagnetic signal from the respective subarray as a respective portion of the redirected amplified electromagnetic signal.

8. The system of claim 7, wherein the respective unit cells of the respective subgroup couple the received electromagnetic signal to the first microstrip line via first respective openings of a slotted plane layer of the respective unit cells of the respective subarray, and wherein the respective unit cells of the respective subarray couple the amplified electromagnetic signal to the respective resonating metallic portions via second respective openings of the slotted plane layer.

9. The system of claim 7, wherein the received electromagnetic signal is a first received electromagnetic signal, wherein the respective subarray is further configured to receive the incoming electromagnetic signal to obtain a second received electromagnetic signal, wherein the respective subarray is further configured to couple the second received electromagnetic signal to the first microstrip line, and wherein the first microstrip line is coupled via the respective switch, in a second respective switch state, to bypass the input of the respective amplifier and couple the first microstrip line to the second microstrip line, to redirect the second received electromagnetic signal from the respective subarray as a respective non-amplified portion of the redirected amplified electromagnetic signal.

10. The system of claim 1, wherein the obtaining of the decision data representing the selected subgroup of the respective amplifiers is forecasted decision data by the trained model based on at least one of: predicted changes in signal quality data, or predicted network demand data representative of a predicted demand for network resources.

11. A method, comprising:
obtaining, by a system comprising a controller, signal data representative of signal quality with respect to a previously redirected electromagnetic signal by a reconfigurable intelligent surface;
determining, by the system based on the signal data, amplification-related data representative of a combined amplification level for the reconfigurable intelligent surface with respect to redirecting an incoming electromagnetic wave as a redirected instance of the incoming electromagnetic wave; and
controlling, by the system based on the combined amplification level, respective switches associated with unit cells of the reconfigurable intelligent surface, to:
operate a first subgroup of the respective switches in a first switch state that couples the incoming electromagnetic wave to respective amplifiers coupled to the respective switches, for redirection of first respective portions of the incoming electromagnetic wave as amplified first respective portions, and
operate a second subgroup of the respective switches in a second switch state that bypasses the respective amplifiers coupled to the respective switches and redirects second respective portions of the incoming electromagnetic wave as non-amplified second respective portions.

12. The method of claim 11, wherein the unit cells are arranged as respective subarrays of unit cells, wherein each respective subarray of the respective subarrays shares a respective switch of the respective switches coupled to a respective amplifier of the respective amplifiers, and wherein the controlling of the respective switches comprises independently controlling each respective switch of each respective subarray.

13. The method of claim 11, wherein the determining of the combined amplification level comprises inputting the signal data into a trained model of the system, and obtaining the amplification-related data as output from the trained model.

14. The method of claim 13, further comprising training, by the system, the trained model based on historical data representative of past signal data representative of past signal qualities with respect to previously redirected electromagnetic signals by the reconfigurable intelligent surface.

15. The method of claim 13, further comprising obtaining, by the system, monitoring data corresponding to the amplified first respective portions, and feeding back, by the system, the monitoring data for subsequent learning by the trained model.

16. The method of claim 13, further comprising obtaining, by the system, failure data corresponding to the amplified first respective portions, and feeding back, by the system, the failure data for subsequent learning by the trained model.

17. The method of claim 13, further comprising obtaining, by the system, error data corresponding to an unsuccessful transmission of the redirected instance of the incoming electromagnetic wave, and feeding back, by the system, the error data for subsequent learning by the trained model.

18. A system, comprising:
   a reconfigurable intelligent surface configured to redirect incoming electromagnetic signals, the reconfigurable intelligent surface comprising respective subarrays of unit cells;
   a controller coupled to a trained model and coupled to the respective subarrays via respective switches; and
   respective amplifiers configured to be selectively coupled to the respective subarrays via the respective switches, wherein the controller is configured to:

obtain signal data representative of a previously redirected electromagnetic signal by the reconfigurable intelligent surface,
   input the signal data into the trained model to obtain an output representative of respective individual switch states of the respective switches, and
   control the respective individual switch states of the respective switches based on the output to selectively couple zero or more of the respective amplifiers, to establish an amplification level of an outgoing electromagnetic signal, redirected from the reconfigurable intelligent surface, based on an incoming electromagnetic signal.

19. The system of claim 18, wherein a respective subarray of the respective subarrays is radio frequency coupled to a first microstrip line, shared by respective unit cells of the respective subarray, that receives the incoming electromagnetic signal, wherein the first microstrip line is selectively coupled via a respective switch of the respective switches to a second microstrip line, shared by the unit cells of the respective subarray, or to an input of a respective amplifier of the respective amplifiers having an output coupled to the second microstrip line, and wherein the second microstrip line is radio frequency coupled to respective resonating metallic portions of the respective unit cells to redirect a portion of the outgoing electromagnetic signal as an amplified portion of the electromagnetic signal or a non-amplified portion of the electromagnetic signal depending on the respective individual switch state of the respective switch as controlled by the controller.

20. The system of claim 19, wherein the first microstrip line is radio frequency coupled to receive the incoming electromagnetic signal through respective first openings, aligned with the respective unit cells, in a slotted plane, and wherein the second microstrip line is radio frequency coupled to the respective resonating metallic through respective second openings in the slotted plane.

\* \* \* \* \*